(12) United States Patent
Mitsunobu et al.

(10) Patent No.: US 8,665,755 B2
(45) Date of Patent: Mar. 4, 2014

(54) COMMUNICATION DEVICE, COMMUNICATION SYSTEM, AND ROUTE ALLOCATION METHOD

(75) Inventors: Hideki Mitsunobu, Kawasaki (JP); Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/031,832

(22) Filed: Feb. 22, 2011

(65) Prior Publication Data

US 2011/0206062 A1 Aug. 25, 2011

(30) Foreign Application Priority Data

Feb. 24, 2010 (JP) .................................. 2010-38140
Dec. 2, 2010 (JP) ................................. 2010-268970

(51) Int. Cl.
*H04L 12/16* (2006.01)
*H04Q 11/00* (2006.01)

(52) U.S. Cl.
USPC ............................ 370/255; 370/351; 370/458

(58) Field of Classification Search
USPC ............ 370/255, 351, 389, 392, 395.31, 410, 370/420, 458
See application file for complete search history.

(56) References Cited

U.S. PATENT DOCUMENTS

| 5,878,029 | A | 3/1999 | Hasegawa et al. |
| 7,187,658 | B2 | 3/2007 | Koyanagi et al. |
| 2004/0014477 | A1* | 1/2004 | Ishiguro et al. ............... 455/450 |
| 2007/0274320 | A1* | 11/2007 | Joshi et al. ................. 370/395.2 |
| 2009/0073924 | A1* | 3/2009 | Chou ............................. 370/328 |
| 2011/0206062 | A1* | 8/2011 | Mitsunobu et al. ........... 370/458 |
| 2011/0292949 | A1* | 12/2011 | Hayashi et al. ............... 370/419 |

FOREIGN PATENT DOCUMENTS

| JP | 9-149038 | 6/1997 |
| JP | 2001-217870 | 8/2001 |
| JP | 2007-142609 | 6/2007 |
| WO | WO-2006/055716 | 5/2006 |

* cited by examiner

*Primary Examiner* — Michael Thier
*Assistant Examiner* — Benjamin H Elliott, IV
(74) *Attorney, Agent, or Firm* — Fujitsu Patent Center

(57) ABSTRACT

A route allocation method including: calculating a route between a sending node and a receiving node in a network; and allocating the route to a communication slot, wherein the allocating selects route allocation for the communication slot based on a number of allocatable routes that are other routes not including a link the transfer direction of which is the same as that of a route, the link being located in the route embedded into the communication slot.

4 Claims, 30 Drawing Sheets

| ROUTE NUMBER | (1) | (2) | (3) | (4) | (5) | (6) | (7) | (8) | (9) | (10) | (11) | (12) |
|---|---|---|---|---|---|---|---|---|---|---|---|---|
| STARTING EDGE | 1 | 1 | 1 | 2 | 2 | 2 | 3 | 3 | 3 | 4 | 4 | 4 |
| ENDING EDGE | 2 | 3 | 4 | 1 | 3 | 4 | 1 | 2 | 4 | 1 | 2 | 3 |

NUMBER OF ROUTES THAT CAN BE EMBEDDED = 7

NUMBER OF ROUTES THAT CAN BE EMBEDDED = 7

NUMBER OF ROUTES THAT CAN BE EMBEDDED = 6

NUMBER OF ROUTES THAT CAN BE EMBEDDED = 12

FIG. 9

| SOURCE \ DESTINATION | 0 | 1 | 2 | 3 |
|---|---|---|---|---|
| 0 |   | 0 | 10 | 5 |
| 1 | 0 |   | 5 | 10 |
| 2 | 0 | 10 |   | 0 |
| 3 | 0 | 0 | 0 |   |

T1

⬇ DIVISION BY GREATEST COMMON DIVISOR 5

| SOURCE \ DESTINATION | 0 | 1 | 2 | 3 |
|---|---|---|---|---|
| 0 |   | 0 | 2 | 1 |
| 1 | 0 |   | 1 | 2 |
| 2 | 0 | 2 |   | 0 |
| 3 | 0 | 0 | 0 |   |

| ROUTE NUMBER | #1 | #2 | #3 | #4 | #5 |
|---|---|---|---|---|---|
| STARTING EDGE | 0 | 0 | 1 | 1 | 2 |
| ENDING EDGE | 2 | 3 | 2 | 3 | 1 |

| PATH NUMBER | 1 | 2 | 3 | 4 | 5 | 6 | 7 | 8 |
|---|---|---|---|---|---|---|---|---|
| STARTING EDGE | 2 | 0 | 0 | 1 | 1 | 1 | 2 | 2 |
| ENDING EDGE | 2 | 2 | 3 | 2 | 3 | 3 | 1 | 1 |

FIG. 11

|  | 0 | 1 | 2 | 3 |
|---|---|---|---|---|
| 0 |  | 0 | 3 | 3 |
| 1 | 0 |  | 3 | 3 |
| 2 | 0 | 3 |  | 0 |
| 3 | 0 | 0 | 0 |  |

DESTINATION (columns), SOURCE (rows), T3

| src | dst | SLOT s1 | SLOT s2 | ... | SLOT sn |
|-----|-----|---------|---------|-----|---------|
| 0 | 4 | 0 | 0 | | 0 |
| 4 | 0 | 0 | 0 | | 0 |
| 4 | 6 | 0 | 0 | | 0 |
| 6 | 4 | 0 | 0 | | 0 |
| 2 | 6 | 0 | 0 | | 0 |
| 6 | 2 | 0 | 0 | | 0 |
| 4 | 5 | 0 | 0 | | 0 |
| 5 | 4 | 0 | 0 | | 0 |
| 4 | 7 | 0 | 0 | | 0 |
| 7 | 4 | 0 | 0 | | 0 |
| 5 | 7 | 0 | 0 | | 0 |
| 7 | 5 | 0 | 0 | | 0 |
| 6 | 7 | 0 | 0 | | 0 |
| 7 | 6 | 0 | 0 | | 0 |
| 1 | 5 | 0 | 0 | | 0 |
| 5 | 1 | 0 | 0 | | 0 |
| 7 | 3 | 0 | 0 | | 0 |
| 3 | 7 | 0 | 0 | | 0 |

FIG. 17A

| STAR TYPE | EXPECTATION VALUE |
|---|---|
| RANDOM | 0.589 |
| SHORT ROUTE | 0.589 |
| LONG ROUTE | 0.589 |
| SLOT UTILIZATION RATIO | 0.664 |
| PRESENT METHOD | 0.699 |

FIG. 17B

| TREE TYPE | EXPECTATION VALUE |
|---|---|
| RANDOM | 0.271 |
| SHORT ROUTE | 0.254 |
| LONG ROUTE | 0.278 |
| SLOT UTILIZATION RATIO | 0.372 |
| PRESENT METHOD | 0.388 |

FIG. 17C

| LADDER TYPE | EXPECTATION VALUE |
|---|---|
| RANDOM | 0.582 |
| SHORT ROUTE | 0.572 |
| LONG ROUTE | 0.581 |
| SLOT UTILIZATION RATIO | 0.653 |
| PRESENT METHOD | 0.699 |

FIG. 17D

| SIMPLE LADDER TYPE | EXPECTATION VALUE |
|---|---|
| RANDOM | 0.527 |
| SHORT ROUTE | 0.520 |
| LONG ROUTE | 0.516 |
| SLOT UTILIZATION RATIO | 0.587 |
| PRESENT METHOD | 0.601 |

FIG. 23

| IP ADDRESS | NETMASK | DESTINATION NODE |
|---|---|---|
| 10.0.3.0 | 255.255.255.0 | E2 |
| 10.0.4.0 | 255.255.255.0 | E2 |

| IP ADDRESS | NETMASK | DESTINATION NODE |
|---|---|---|
| 10.0.3.0 | 255.255.255.0 | E3 |
| 10.0.4.0 | 255.255.255.0 | E4 |

COMMUNICATION DEVICE, COMMUNICATION SYSTEM, AND ROUTE ALLOCATION METHOD

CROSS-REFERENCE TO RELATED APPLICATION

This application is based upon and claims the benefit of priority from the prior Japanese Patent Application No. 2010-38140 filed on Feb. 24, 2010 and No. 2010-268970 filed on Dec. 2, 2010, the entire contents of which are incorporated herein by reference.

FIELD

The present invention relates to a communication device that performs data communication, a communication system in which data communication is performed, and a route allocation method for performing route allocation.

BACKGROUND

The amount of information circulating on networks significantly increases with the magnification of multimedia services due to Internet and the like, and hence traffic traveling across information communication networks greatly increases.

If the traffic increases, the number of simultaneously arriving packets increases, for example, in a router included in a network, and hence the number of buffering of packets increases or a load on the control of route calculation based on a routing table increases.

Therefore, memory devices such as a large capacity memory used for a packet buffer and a high-speed memory used for route calculation, which require a measurable amount of power, have been disposed in the router.

In recent years, while demand for the construction of a low power network is great, as described above, in particular, the power consumption of routers greatly influences the power consumption of an entire network, and to what extent the power consumption of routers can be reduced may be the key to the saving of the electric power of networks.

As a technique of the related art, Japanese Unexamined Patent Application Publication No. 2001-217870 proposes a technique in which an adequate network is selected on the basis of static and dynamic pieces of information relating to a plurality of networks. In addition, Japanese Unexamined Patent Application Publication No. 2007-142609 proposes a technique in which, when path route setting is performed, the route setting for a path is performed using an evaluation function in which the number of paths expected to pass through a corresponding link is used as a parameter. Furthermore, Japanese Unexamined Patent Application Publication No. 9-149038 proposes a technique in which the shortage of band is eliminated by virtually performing band allocation on the basis of desired-band information written into a packet. Furthermore, PCT Application Publication WO2006/055716 proposes a technique in which individual nodes communicate the information of a best possible adjacent node with one another, and a communication path directed to a core is created using the information of the best possible adjacent node as information used for approaching a network core.

SUMMARY

According to an aspect of the invention, a route allocation method including: calculating a route between a sending node and a receiving node in a network; and allocating the route to a communication slot, wherein the allocating selects route allocation for the communication slot based on a number of allocatable routes that are other routes not including a link the transfer direction of which is the same as that of a route, the link being located in the route embedded into the communication slot.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a table of Min band demands and a table of values obtained by dividing Min band demands by a greatest common divisor;

FIG. 10A is a diagram illustrating a route table;

FIG. 10B is a diagram illustrating a path table;

FIG. 11 is a diagram illustrating a table on which a shortest hop count is listed;

FIG. 12 is a diagram illustrating a table on which a used state or an unused state of a link is listed;

FIGS. 17A to 17D are diagrams illustrating expectation value calculation results;

FIG. 23 is a diagram illustrating a correspondence table between a destination address and a destination node;

FIG. 24 is a diagram illustrating a correspondence table between a destination address and a destination node;

DESCRIPTION OF EMBODIMENTS

Figure 1:
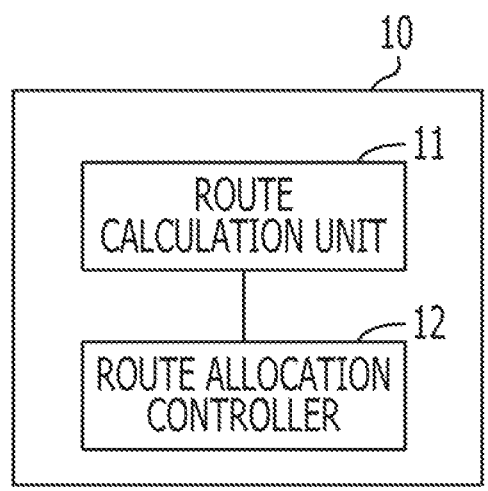
FIG. 1 is a diagram illustrating an example of a configuration of a communication device.

When a low power network is constructed, a communication method may be considered in which a slot (time slot) for a packet to be transmitted is allocated in advance on a server side that manages a network, and packet transfer is performed with time division base.

The communication method is a method in which, after arranging a schedule for packet transfer such as "when the packet transfer is performed", "the packet is transferred from what transmission source to what destination", or the like, a server carries out packet sending. By performing such a control operation described above, for example, the frequency of the occurrence of a state in which a plurality of packets simultaneously arrive in a router may be reduced, and the number of buffering may be reduced. Therefore, a large capacity memory that requires a measurable amount of power and has been used as a packet buffer can be substantially excluded from the router.

In addition, for example, since it is not necessary for the router itself to perform route calculation that has been previously performed, the reduction of a load necessary for the route calculation can be promoted. Therefore, the use of the large capacity memory that requires a measurable amount of power and has been used for the route calculation may be eliminated. In addition, while, in the above description, attention is focused on the power consumption of the router, the power consumption of a switch included in the network may also be reduced on the basis of a similar reason.

By performing scheduling on the basis of the above-mentioned packet route allocation, the power consumption of the router can be reduced, and eventually the electric power of the entire network can be saved. On the other hand, when the scheduling is performed, it may be assumed that, because of higher priority on the promotion of effective utilization of a band, a scheduling operation in which as many routes as possible are allocated to a limited number of slots is performed.

However, since traffic constantly fluctuates during the operation of the network, there is a possibility that route usage requests occur the number of which exceeds the number of routes prepared on the basis of scheduling performed before the operation of the network. Consequently, a band based on slots statically determined by such scheduling as described above may lead to the incompletion of packet transfer. Furthermore, in order to deal with routes the number of which increase owing to the traffic fluctuation, it may be necessary to reschedule the route allocation.

In this way, it is difficult for the scheduling, in which a large number of routes are simply packed into slots without the increase of the number of routes due to the traffic fluctuation being predicted, to deal with a case in which the number of routes is increased. In addition, since it is necessary to perform the scheduling again, the packet route allocation becomes inefficient.

In view of the above-mentioned problems, the present invention is made, and an object of the present invention is to provide a communication device that promotes the improvement of communication efficiency. In addition, another object of the present invention is to provide a communication system that promotes the improvement of communication efficiency.

Furthermore, another object of the present invention is to provide a route allocation method that promotes the improvement of communication efficiency by scheduling slot allocation on the basis of the prediction of route fluctuations.

Hereinafter, an embodiment of the present invention will be described with reference to figures. FIG. 1 is a diagram illustrating an example of the configuration of a communication device. A communication device 10 includes a route calculation unit 11 and a route allocation controller 12. For example, the communication device 10 is disposed in a management server for a network, or the like.

The route calculation unit 11 calculates a route between a sending node and a receiving node in the network. The route allocation controller 12 allocates a route to a communication slot before the operation of the network. In this case, the route is allocated to the communication slot in such a manner that more routes can also be allocated to the communication slot during the operation of the network so that data collision does not occur and route fluctuations can be coped with.

Here, when routes are allocated to a plurality of communication slots, the route allocation controller 12 calculates an expectation value to be an index of the number of routes allocatable to slots, and selects route allocation in which the expectation value becomes a maximum value.

For example, even if the number of routes increases owing to traffic fluctuations in the network, such a configuration as described above enables route allocation to be performed during the operation of the network, and can flexibly deal with the increase of the number of routes.

In addition, it is not necessary to reschedule the route allocation, and the improvement of the communication efficiency can be promoted. In addition, in the following description, a communication slot is simply called a slot. In addition, an expression, "a route is embedded", is also used as the allocation of a route to a slot.

Next, terms such as "slot", "route", and "path" will be described. The "slot" is a time interval used for transmitting a packet, and the length of the time interval is constant. In addition, the "slot" seizes a certain range of a fixed time interval in a frame. A slot of a specific number is unique in the frame, and since the frame is periodically repeated, a slot of a specific number in the frame is also repeated with the same period.

The "route" is defined as a combination of a sending edge node and a receiving edge node (Usually, a relay node located between a sending node and a receiving node is not considered). In addition, a band demand as a desired band is provided to a route. Furthermore, a route includes one or more paths (allocated in accordance with a band).

The "path" is defined as a combination of links (transmission paths establishing connections between nodes) extending from sending edge nodes to receiving edge nodes in one slot. The band of one path is a minimum unit of band allocation, and is expressed as (link speed/the number of slots).

Next, the expectation value (route embedding expectation value) will be described. The expectation value is an index of the number of routes allocatable to a slot, and indicates what percentage of all routes can be allocated to one slot. Here, when the maximum number of slots is S, the number of routes is C, link speed between nodes is v, the band of one slot is b, and the sum of routes allocatable to n (=v/b) slots is k, the expectation value is defined with the following Expression (1).

$$\text{Expectation value} = (\Sigma \text{ the number of routes allocatable to a slot } n)/(\text{the number of routes} \ast \text{the maximum number of slots}) = k/(C \ast S) \quad (1)$$

The expectation value ranges from 0 to 1. In addition, when the expectation value is 0, the expectation value indicates that a slot has no room for embedding more routes thereinto, and when the expectation value is 1, the expectation value indicates that a slot has room for embedding routes thereinto up to the maximum number.

When the expectation value is great, the slot is regarded as being in a state desirable for the change of a route due to the traffic fluctuations (That the expectation value is great indicates that the margin of route embedding is large, and hence even if a route-increase request is made, a route can be dynamically embedded into a slot during the operation).

Figure 2:
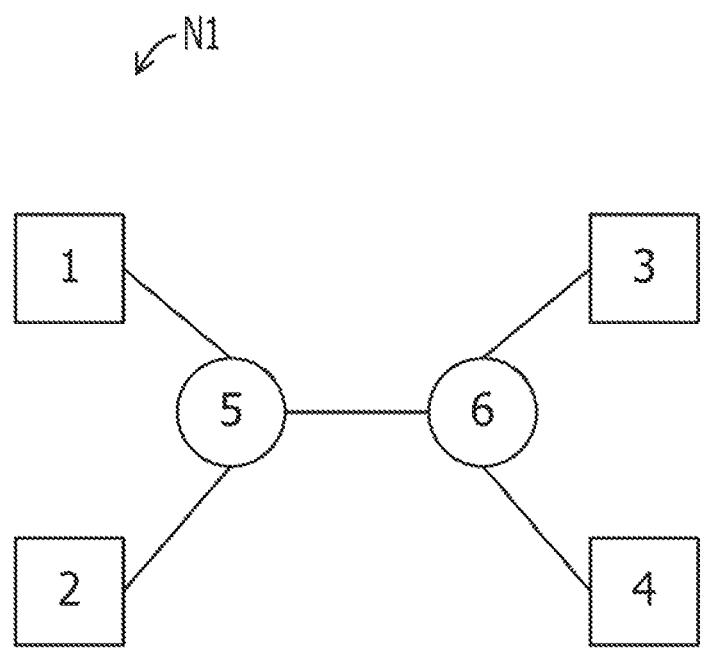
FIG. 2 is a diagram illustrating an example of a configuration of a network.

Next, examples of the calculation of the number of routes and the calculation of the expectation value will be described with reference to FIGS. 2 to 5B. FIG. 2 is a diagram illustrating an example of the configuration of a network. Hereinafter, a square frame indicates an edge node, and a round frame indicates a relay node.

A network N1 includes edge nodes 1 to 4 and relay nodes 5 and 6. The edge node 1 is connected to the relay node 5, the edge node 2 is connected to the relay node 5, the edge node 3 is connected to the relay node 6, and the edge node 4 is connected to the relay node 6. In addition, the relay node 5 is connected to the relay node 6.

In the network N1, when connections between the nodes are established in a full mesh connection, the number of routes is 12 (When halfway relay nodes establishing connections between the edges are also indicated, there are a total of 12 routes, namely, 1→5→2, 1→5→6→3, 1→5→6→4, 2→5→1, 2→5→6→3, 2→5→6→4, 3→6→5→1, 3→6→5→2, 3→6→4, 4→6→5→1, 4→6→5→2, and 4→6→3. ).

Figure 3:
FIG. 3 is a diagram illustrating a route table.

FIG. 3 is a diagram illustrating a route table. A table T0 is illustrated in which a number is assigned to a route extending from a starting edge node to an ending edge node. If it is assumed that a slot (called slot s1) is unused, any one of routes in the table T0 can be embedded into the slot s1. Namely, "the number of routes that can be embedded into the slot s1" is 12.

Figure 4:
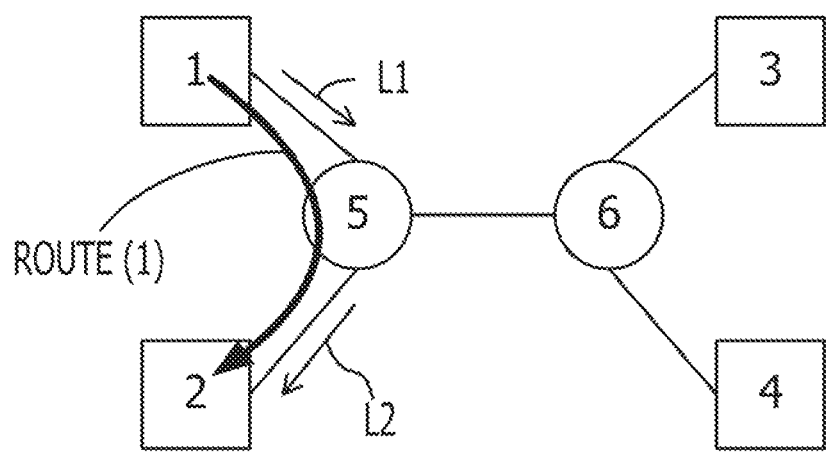
FIG. 4 is a diagram illustrating a route that a slot uses.

FIG. 4 is a diagram illustrating a route that a slot uses. It is assumed that a route (1) 1→5→2 indicated by a thick arrow illustrated in FIG. 4 is currently embedded into the slot s1. How many more routes can be selected from among routes (2) to (12) and be embedded will be considered.

Here, with respect to "to be embedded" or "not able to be embedded", for a route that has already been embedded into a slot, a route that does not share a link, the data transfer direction of which is the same as that of the link of the former route, does not cause data collision to occur, and hence the corresponding route can be embedded into the slot.

In addition, for a route that has already been embedded into a slot, a route including a link that shares a link, the data transfer direction of which is the same as that of the link of the former route, causes data collision to occur, and hence the corresponding route is not able to be embedded into the slot.

As illustrated in FIG. 4, a link the data transfer direction of which is from the edge node 1 to the relay node 5 is defined as a link L1, and a link the data transfer direction of which is from the relay node 5 to the edge node 2 is defined as a link L2.

For example, in a case in which a route 1→5→6→3 of the route (2) is considered, since the link L1 is shared by the route (1) and the route (2), the route (2) is not able to be embedded into the slot s1 into which the route (1) has already been embedded.

On the other hand, since a route 3→6→4 of the route (9) does not share the links L1 and L2, the route (9) can be embedded into the slot s1. In addition, since, in a route 2→5→1 of the route (4), data is transferred in a direction opposite to the data transfer directions of the links L1 and L2, it turns out that the route (4) does not share the links L1 and L2, and hence the route (4) can be embedded into the slot s1.

When, in the way of thinking, a route able to be embedded into the slot s1 into which the route (1) has already been embedded is spotted, there are 7 routes (4), (5), (6), (7), (9), (10), and (12) in the case of the example. Accordingly, "the number of routes able to be embedded into the slot s1" into which the route (1) has been already embedded turns out to be 7.

FIGS. 5A, 5B, 6A, and 6B are diagrams illustrating routes that slots use. It is assumed that there are a total of 4 slots (=n) (slots s1 to s4), and it is assumed that a route is currently embedded into each of the slots s1 to s4 in usage situations as illustrated in FIGS. 5A, 5B, 6A, and 6B.

Figure 5A:
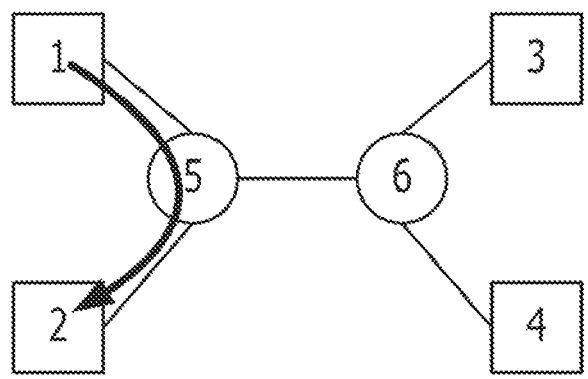
FIGS. 5A and 5B are diagrams illustrating routes that slots use.
Figure 5B:
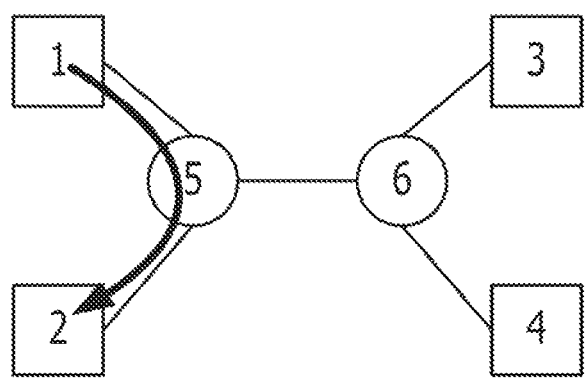
Figure 6A:
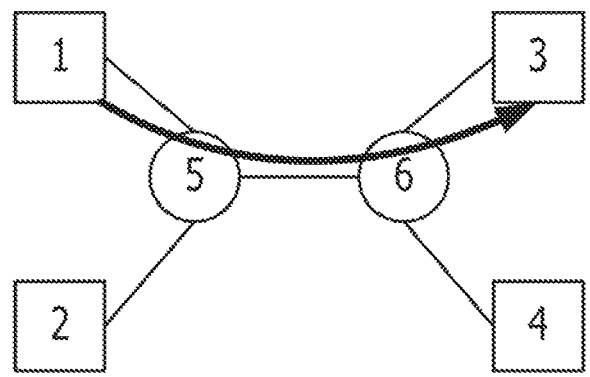
FIGS. 6A and 6B are diagrams illustrating routes that slots use.
Figure 6B:
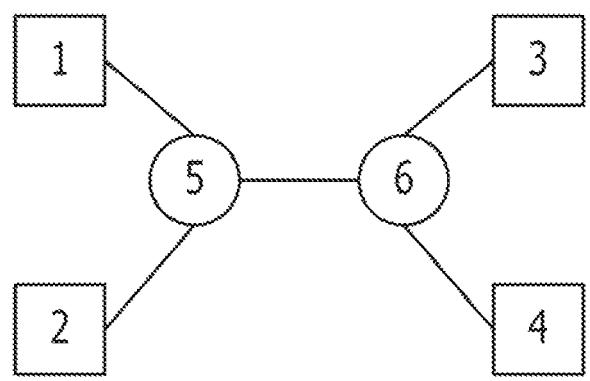

Namely, with respect to FIG. 5A, the route (1) is embedded into the slot s1. In addition, with respect to FIG. 5B, the route (1) is also embedded into the slot s2. With respect to FIG. 6A, the route (2) is embedded into the slot s3. In addition, with respect to FIG. 6B, no route is embedded into the slot s4.

In this case, if the number of routes that can be embedded into the slots s1 to s4 is obtained in such a way of thinking as described above, the number of routes that can be further embedded into the slot s1 turns out to be 7, and the number of routes that can be further embedded into the slot s2 turns out to be 7. In addition, the number of routes that can be further embedded into the slot s3 turns out to be 6, and the number of routes that can be embedded into the slot s4 turns out to be 12.

Accordingly, since the sum of the number of routes that can be embedded into the slots s1 to s4 is (7+7+6+12), the number of all routes in the network N1 is 12, and the maximum number of slots is 4, the expectation value turns out to be (7+7+6+12)/(12*4)=0.67 on the basis of Expression (1).

This indicates that if 12 routes in the network N1 correspond to 100%, routes corresponding to about 67% can be still embedded into the slots s1 to s4.

Figure 7:
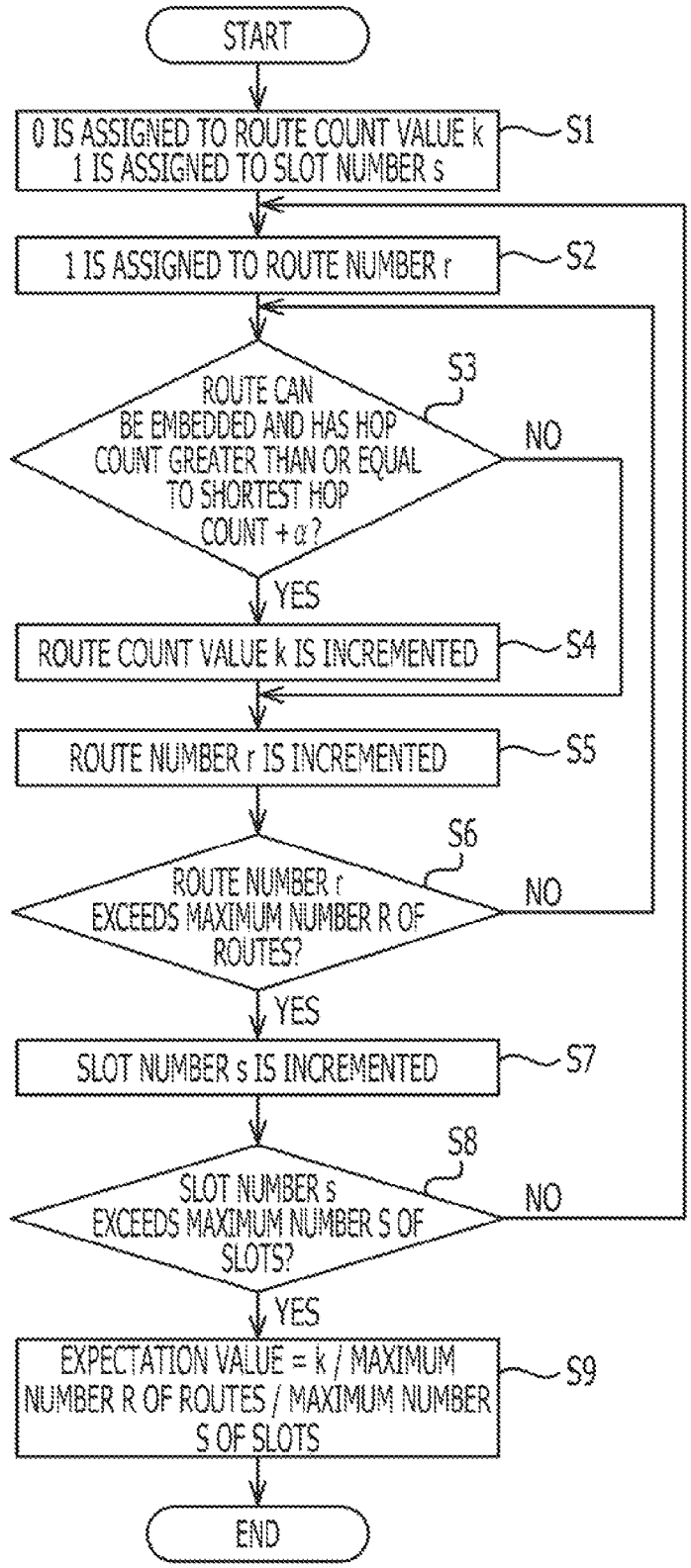
FIG. 7 is a diagram illustrating a calculation flow of an expectation value.

Next, the calculation flow of the expectation value will be described. FIG. 7 is a diagram illustrating the calculation flow of the expectation value. In addition, with respect to the first path (a sending edge node→a receiving edge node), it is assumed that the combination of links of routes contained in the slot is obtained, for example, using a Dijkstra method (a general calculation algorithm used for solving a shortest route problem).

[S1] 0 is assigned to the count value k of a route counter, and 1 is assigned to a slot number s.

[S2] 1 is assigned to a route number r.

[S3] It is determined whether or not a route r can be embedded into the slot s and has a hop count greater than or equal to a shortest hop count+α(α=1, 2, 3, ... ). If the route r has a hop count greater than or equal to the shortest hop count+α, the processing operation proceeds to Step S4, and if the route r has a hop count lower than the shortest hop count+α, the processing operation proceeds to Step S5.

[S4] The count value k of the route counter is incremented.

[S5] The route number r is incremented.

[S6] It is determined whether or not the route number r exceeds the maximum number R of routes. If the route number r exceeds the maximum number R of routes, the processing operation proceeds to Step S7, and if the route number r does not exceed the maximum number R of routes, the processing operation returns to Step S3.

[S7] The slot number s is incremented.

[S8] It is determined whether or not the slot number s exceeds the maximum number S of slots. If the slot number s exceeds the maximum number S of slots, the processing operation proceeds to Step S9, and if the slot number s does not exceed the maximum number S of slots, the processing operation returns to Step S2.

[S9] The expectation value is calculated (the expectation value=the route count value k/(the maximum number R of routes*the maximum number S of slots)).

Here, the processing operation performed in Step S3 will be described. For example, it is assumed that routes #11 to #14 exist as routes extending from a sending node A to a receiving node B, and it is assumed that the routes #11 to #14 include links the data transfer directions of which are different from the data transfer direction of a link in a route currently embedded into the slot s (Namely, any one of the routes is a route that can be embedded into the slot s). In addition, it is assumed that the hop count of the route #11 is 10, the hop count of the route #12 is 11, the hop count of the route #13 is 12, and the hop count of the route #14 is 13.

At this time, in a case in which an upper limit value α is 3, since the shortest hop count is 10, on the basis of the determination process performed in Step S3, it turns out that the route #14, the hop count of which is 13 (=10+3), is not to be embedded into a corresponding slot (The routes #11 to #13 are allocated to a slot).

Namely, since the routes #11 to #14 include links the data transfer directions of which are different from the data transfer direction of a link in a route currently embedded into the slot s, all of the routes #11 to #14 can be embedded into the current slot s only under this condition. However, by also adding a constraint condition of the hop count as illustrated in Step S3, it turns out that a route whose hop count between a sending node and a receiving node exceeds an allowable range is excluded.

In this way, even if a route does not include a link the data transfer direction of which is the same as the data transfer direction of a link in a route currently embedded into a slot, the setting of the upper limit value α results in excluding the route when the route has a hop count greater than or equal to the shortest hop count+α. Accordingly, in the case of a network topology in which there are a number of indirect routes, a route the hop count of which is long may be prevented from being selected as a communication channel for packet transfer.

Next, using slot allocation states illustrated in FIGS. 5A, 5B, 6A, and 6B as examples, the calculation operation for the expectation value performed using the flow illustrated in FIG. 7 will be described. In addition, a loop returning from Step S8 to Step S2 in the expectation value calculation flow is called an outer loop, and a loop returning from Step S6 to Step S3 in the expectation value calculation flow is called an inner loop.

Since the number of all slots is 4, the outer loop is traced four times, and the slot number s changes in such a manner as 1→4. In addition, since the number of selectable routes is 12, the route number r changes in such a manner as 1→12 each time the outer loop is traced.

(First Processing Operation in Outer Loop)

Since the condition s=1 and k=0 is defined on the basis of Step S1, the processing operation is started under a condition r=1 defined in Step S2. Since, in the first execution of the inner loop, the route (1) is not able to be embedded into the slot s1, determination performed in Step S3 corresponds to "no", and a condition r=2 is defined in Step S5. In addition, since determination performed in Step S6 corresponds to "no", the processing operation returns to Step S3 (k=0).

Since, in the second execution of the inner loop, the route (2) is not able to be embedded into the slot s1, determination performed in Step S3 corresponds to "no", and a condition r=3 is defined in Step S5. In addition, since determination performed in Step S6 corresponds to "no", the processing operation returns to Step S3 (k=0).

Since, in the third execution of the inner loop, the route (3) is not able to be embedded into the slot s1, determination performed in Step S3 corresponds to "no", and a condition r=4 is defined in Step S5. In addition, since determination performed in Step S6 corresponds to "no", the processing operation returns to Step S3 (k=0).

Since, in the fourth execution of the inner loop, the route (4) is able to be embedded into the slot s1, determination performed in Step S3 corresponds to "yes", and a condition k=1 is defined in Step S4. In addition, since a condition r=5 is defined in Step S5, and determination performed in Step S6 corresponds to "no", the processing operation returns to Step S3 (k=1).

Since, in the fifth execution of the inner loop, the route (5) is able to be embedded into the slot s1, determination performed in Step S3 corresponds to "yes", and a condition k=2 is defined in Step S4. In addition, since a condition r=6 is defined in Step S5, and determination performed in Step S6 corresponds to "no", the processing operation returns to Step S3 (k=2).

Subsequently, in the same way, since, in the eleventh execution of the inner loop, the route (11) is not able to be embedded into the slot s1, determination performed in Step S3 corresponds to "no", and a condition r=12 is defined in Step S5. In addition, since determination performed in Step S6 corresponds to "no", the processing operation returns to Step S3 (k=6).

Since, in the twelfth execution of the inner loop, the route (12) is able to be embedded into the slot s1, determination performed in Step S3 corresponds to "yes", and a condition k=7 is defined in Step S4. In addition, since a condition r=13 is defined in Step S5, and determination performed in Step S6 corresponds to "yes", the processing operation proceeds to Step S7. In addition, since a condition s=2 is defined in Step S7, and determination performed in Step S8 corresponds to "no", the processing operation returns to Step S2.

(Second Processing Operation in Outer Loop)

The processing operation is started under a condition s=2 and k=7. In the first execution of the inner loop (r=1), the route (1) is not able to be embedded into the slot s2 (k=7). Subsequently, in the same way, since, in the twelfth execution of the inner loop (r=12), the route (12) is able to be embedded into the slot s2, a condition k=14 is defined.

(Third Processing Operation in Outer Loop)

The processing operation is started under a condition s=3 and k=14. In the first execution of the inner loop (r=1), the route (1) is not able to be embedded into the slot s3 (k=14). Subsequently, in the same way, since, in the twelfth execution of the inner loop (r=12), the route (12) is not able to be embedded into the slot s3 (k=20). In addition, the routes (4), (7), (8), (9), (10), and (11) are able to be embedded into the slot s3.

(Fourth Processing Operation in Outer Loop)

The processing operation is started under a condition s=4 and k=20. Since, in the first execution of the inner loop (r=1), the route (1) is able to be embedded into the slot s4, a condition k=21 is defined. Subsequently, in the same way, since, in the twelfth execution of the inner loop (r=12), the route (12) is able to be embedded into the slot s4, a condition k=32 is defined. In addition, any one of the routes (1) to (12) is able to be embedded into the slot s4.

After such loop processing operations as described above are repeated, the expectation value is calculated as k/R/S=32/12/4=0.67 on the basis of Step S9. Next, a route allocation algorithm for allocating a route to a slot will be described. In addition, the content of the following [1] mainly corresponds to an operation performed in the route calculation unit 11, and the content of the following [2] mainly corresponds to an operation performed in the route allocation controller 12.

[1] The minimum band demands (Min band demands) of all routes are divided by the greatest common divisor thereof (the band of one slot), and the number of paths necessary for each route is calculated. In addition, the number of slots is determined on the basis of (link speed/the band of one slot). In addition, it is assumed that the number of all routes is L, the number of all paths is M, and the number of slots is n.

[2] M paths are allocated to n slots on the basis of the calculation and the comparison of the expectation value performed in accordance with the following procedures (a) to (g).

(a) A first path (a sending edge node→a receiving edge node) is extracted, and the combination of links to be contained in a slot is obtained, for example, using the Dijkstra method.

(b) It is determined whether or not the hop count of the obtained combination stays within "the shortest route+the upper limit value".

(c) If the hop count stays within "the shortest route+the upper limit value", the expectation value of the slot when the corresponding slot is contained is calculated. In addition, with respect to all routes, it is determined on the basis of the Dijkstra method whether or not each route can be contained, and the number of routes able to be contained is counted, thereby calculating the expectation value.

(d) The procedures illustrated in (a) to (c) are performed on an arbitrary slot for an arbitrary path (a round-robin calculation corresponding to M*N calculations).

(e) By comparing the expectation values of up to M*N calculations with one another, obtained from the results of up to (d), a path having the maximum expectation value is determined as a fixed path (or a fixed route), and is registered.

(f) The path determined in (e) is removed from paths to be allocated (the number thereof is M), and the procedures in (a) to (e) is performed on the set of the paths (remaining M−1 paths).

(g) The procedures in (a) to (f) are repeated until no path to be allocated remains.

Figure 8:
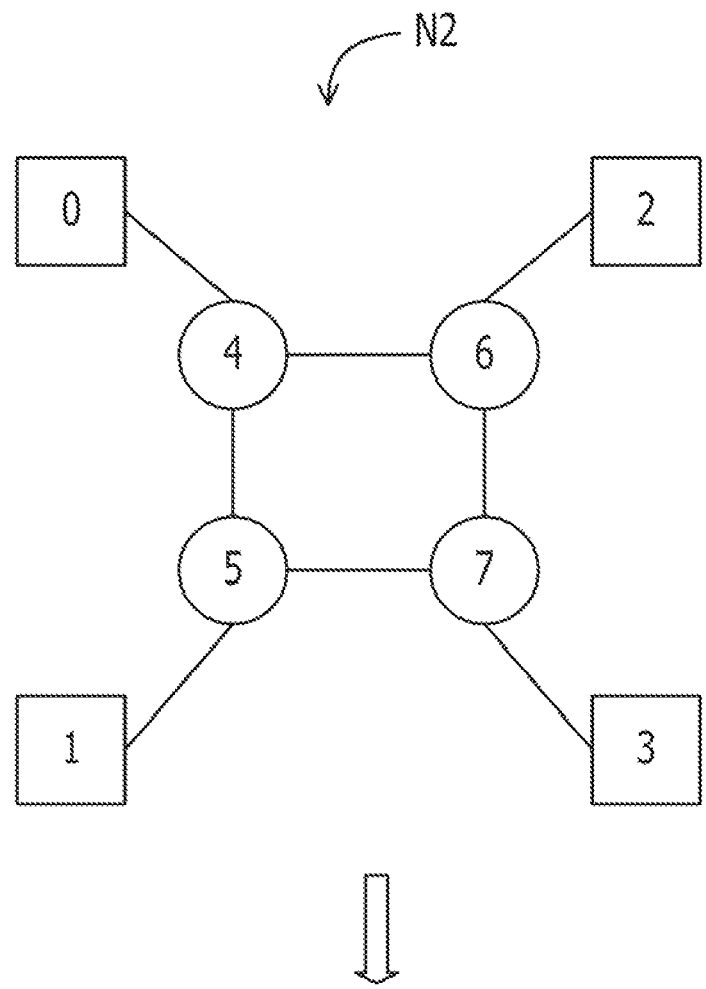
FIG. 8 is a diagram illustrating an example of a configuration of a network.

The operation of the route allocation algorithm will be described with illustrating an example. FIG. 8 is a diagram illustrating an example of the configuration of a network. A network N2 includes edge nodes 0 to 3 and relay nodes 4 to 7. The edge node 0 is connected to the relay node 4, the edge node 1 is connected to the relay node 5, the edge node 2 is connected to the relay node 6, and the edge node 3 is connected to the relay node 7. In addition, the relay node 4 is connected to the relay node 5, the relay node 5 is connected to the relay node 7, the relay node 7 is connected to the relay node 6, and the relay node 6 is connected to the relay node 4.

With respect to the Min band demand of each route in the network N2, it is assumed that the Min band demand of a route 0→2 is 10 Mbps, the Min band demand of a route 0→3 is 5 Mbps, the Min band demand of a route 1→3 is 10 Mbps, the Min band demand of a route 1→2 is 5 Mbps, and the Min band demand of a route 2→1 is 10 Mbps. FIG. 9 is a diagram illustrating a table of Min band demands and a table of values obtained by dividing the Min band demands by a greatest common divisor. A table T1 corresponds to Min band demands expressed in a table format. In addition, a table T2 corresponds to values expressed in a table format, the values being obtained by dividing the Min band demands by the greatest common divisor thereof (the greatest common divisor corresponding to the band of one slot). In this example, since the greatest common divisor of the Min band demand is 5, values illustrated in the table T2 is obtained when the division is performed.

Here, since the number of paths necessary for the Min band demands of individual routes becomes a total sum of numerical values in the table T2, the number M of all paths turns out to be M=8 (=2+1+1+2+2) (Namely, since the number of the paths of the route 0→2 is 2, the number of the paths of the route 0→3 is 1, the number of the paths of the route 1→2 is 1, the number of the paths of the route 1→3 is 2, and the number of the paths of the route 2→1 is 2, the number of paths becomes 8 in total).

In addition, since the number L of all routes corresponds to the number of item fields of the table T2 in which numerical values other than 0 are written, and the number of fields is 5, a result L=5 is obtained. Furthermore, with respect to the maximum number n of slots, for example, if link speed is 100 Mbps, and the band of one slot is 5, an equation 100/5=20 is satisfied, and a result n=20 slots is obtained.

FIG. 10A is a diagram illustrating a route table T11. FIG. 10B is a diagram illustrating a path table T12. When a table is created by assigning numbers to the routes and the paths that are obtained in such a manner as described above, the route table T11 and the route table T12 are obtained. The route table T11 is a table created by assigning numbers #1 to #5 to 5 routes. The path table T12 is a table created by assigning numbers to 8 paths.

FIG. 11 is a diagram illustrating a table on which a shortest hop count is listed. A table T3 indicates a hop count relating to how many hops can be used for connecting a shortest route to be used. In view of the node connection configuration of the network N2, the shortest hop count is 3 with respect to all routes 0→2, 0→3, 1→3, 1→2, and 2→1.

FIG. 12 is a diagram illustrating a table on which a used state or an unused state of a link is listed. A table T4 is a table in which, with respect to each link connecting a transmission source node (src) and a destination node (dst) to each other, 1 is registered in a used link that has already been allocated to a slot, and 0 is registered in an unused link that has not been allocated to a slot. Using such a table T4, the used state and the unused state of a link are managed, and a link into which 1 is written may be excluded.

In addition, the table T4 may be maintained using an adjacency matrix in place of the pair of src/dst. In this case, by providing a plurality of adjacency matrices and writing 0 into a portion of a former matrix, into which 1 has been written, the exclusion of a route is expressed.

Next, expectation values are calculated with respect to routes listed on the table T2 (5 routes in total). As a route, a shortest route is used that can be created using a link defined as an unused state in the table T4.

As an example of the calculation of expectation values relating to the allocation of routes #1 to #5 to slots s0 to s19, an expectation value calculated when the route #1 (0→2) is embedded into the slot s0 is a1 (When the route #1 is embedded into the slot s1, an index indicating how many more routes can be embedded into the slot s1 is a1). When the route #1 (0→2) is embedded into the slot s1, the expectation value is a2. Subsequently, in the same way, the expectation values of up to the slot s19 are calculated.

With respect to the calculation of the expectation value of a subsequent route, the expectation value calculated when the route #2 (0→3) is embedded into the slot s0 is b1. When the route #2 (0→3) is embedded into the slot s1, the expectation value is b2. Subsequently, in the same way, the expectation values of up to the slot s19 are calculated.

With respect to the calculation of the expectation value of a subsequent route, the expectation value calculated when the route #3 (1→2) is embedded into the slot s0 is c1. When the route #3 (1→2) is embedded into the slot s1, the expectation value is c2. Subsequently, in the same way, the expectation values of up to the slot s19 are calculated, and subsequently, in the same way, the expectation values of up to the route #5 are calculated.

In this way, with respect to all routes #1 to #5, expectation values when the routes are provisionally allocated to all slots s0 to s19 are calculated. In addition, when the calculation of the expectation values is completed, a slot having a maximum expectation value is selected from among the slots (When there are slots having the same maximum expectation value, any one of the slots having the maximum expectation value may be selected. For example, a slot having a small slot number may be selected.)

Here, it is assumed that the number of routes is M (routes #1 to #M), and it is assumed that such an expectation value calculation as described above is performed on a predetermined number of slots. In addition, for example, if it is assumed that an expectation value calculated when the route #2 is embedded into the slot s0 becomes a maximum value, the route #2 is called a fixed route, and the same expectation value calculation as described above is performed again on (M−1) routes from which the fixed route is excluded. By repeating such a processing operation described above, M fixed routes are finally calculated.

Figure 13:
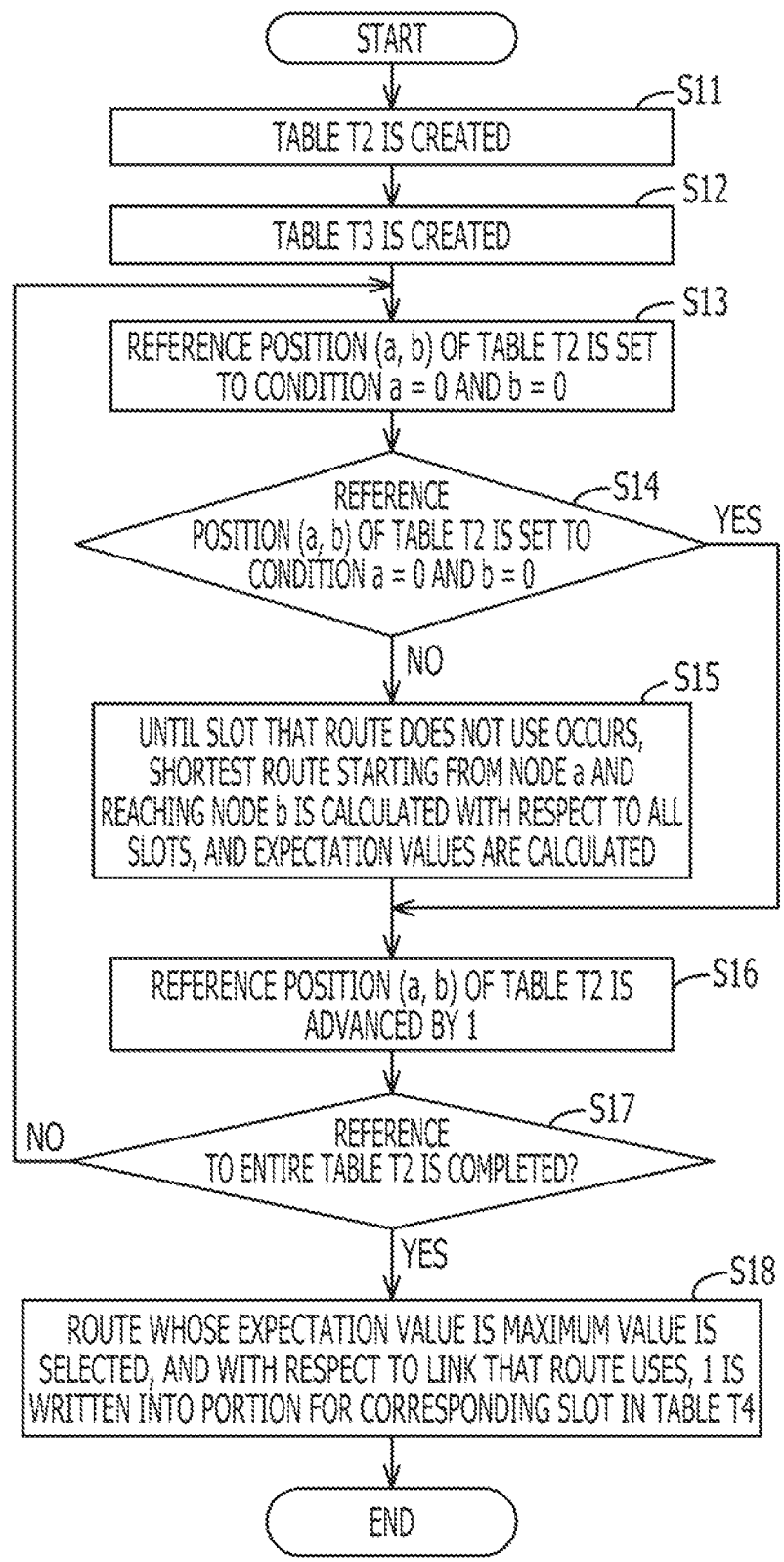
FIG. 13 is a flowchart illustrating an entire operation of a route allocation algorithm.

In addition, with respect to a link that has been used for route determination, 1 is registered in the corresponding portion thereof in the table T4, and the link is excluded from the targets of route search performed after the link is registered as a used link. Next, the operation flow of the route allocation algorithm will be described. FIG. 13 is a flowchart illustrating the entire operation of the route allocation algorithm.

[S11] The table T2 is created (Values obtained by dividing Min band demands by the greatest common divisor thereof are expressed in a table format).

[S12] The table T3 is created (The shortest hop counts of individual routes are calculated and expressed in a table format).

[S13] The reference position (a, b) of the table T2 is set to a condition a=0 and b=0.

[S14] It is determined whether or not the value of the reference position (a, b) of the table T2 is 0. When the value of the reference position (a, b) is not 0, the processing operation proceeds to Step S15. In addition, the value of the reference position (a, b) is 0, the processing operation proceeds to Step S16.

[S15] Until a slot that a route does not use occurs, a shortest route starting from a node a and reaching a node b is calculated with respect to all slots, and all expectation values are calculated.

[S16] The reference position (a, b) of the table T2 is advanced by 1.

[S17] When reference to the entire table T2 is completed, the processing operation proceeds to Step S18. In addition, when the reference to the entire table T2 is not completed, the processing operation returns to Step S13.

[S18] A route the expectation value of which is a maximum value is selected, and with respect to a link that the route uses, 1 is written into a portion for a corresponding slot in the table T4.

Figure 14:
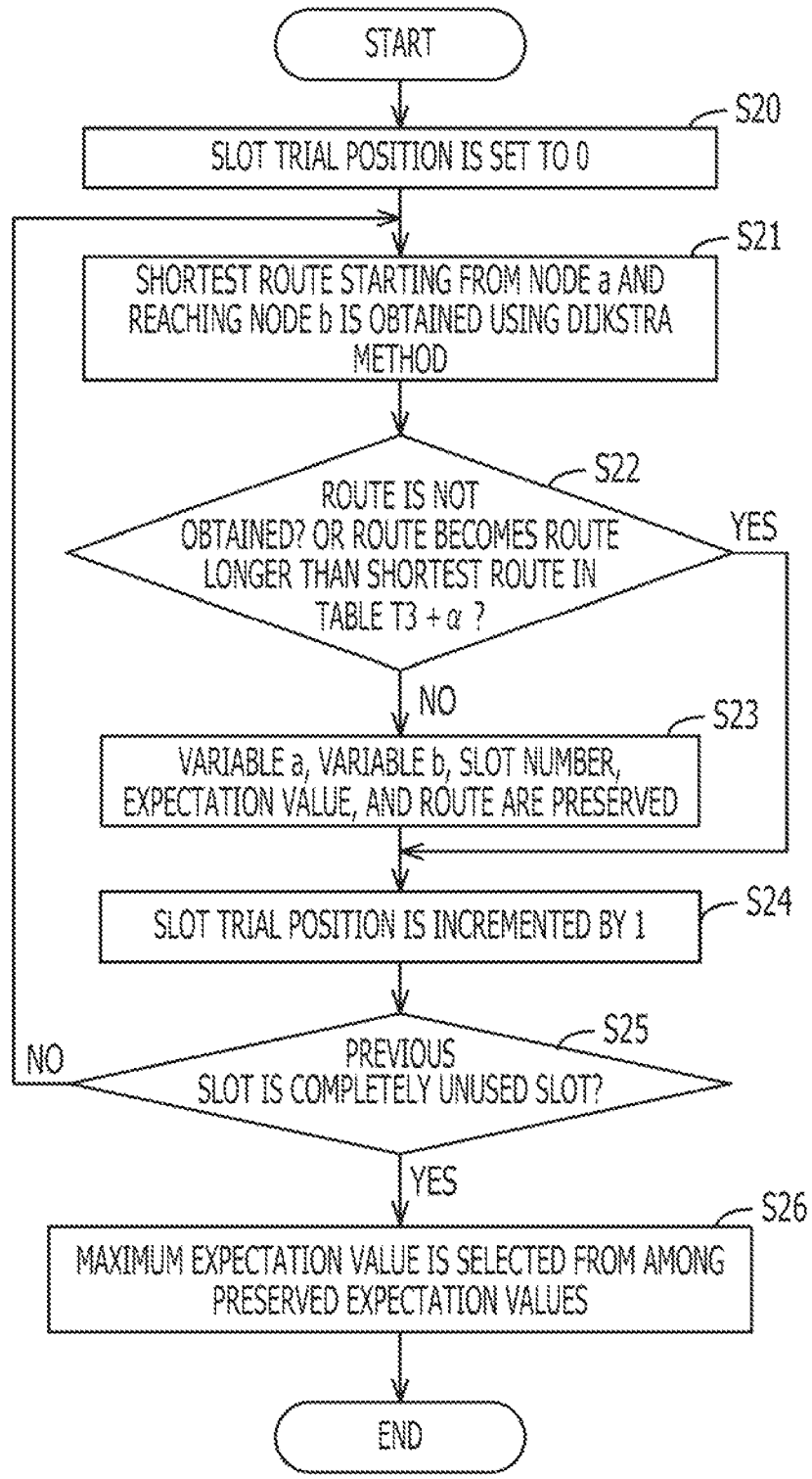
FIG. 14 is a flowchart illustrating an operation of a maximum expectation value calculation.

FIG. 14 is a flowchart illustrating the operation of a maximum expectation value calculation.

[S20] A slot trial position is set to 0 (Namely, the slot trial starts from the slot s0).

[S21] A corresponding portion in the table T4 is referred to, and a shortest route starting from the node and reaching the node b is obtained using the Dijkstra method.

[S22] It is determined whether the shortest route is not obtained or the route becomes a route longer than the shortest route in the table T3+α. When the shortest route is not obtained or the shortest route becomes a route longer than the shortest route in the table T3+α, the processing operation proceeds to Step S24. In addition, when the shortest route is obtained and the shortest route does not become a route longer than the shortest route in the table T3+α, the processing operation proceeds to Step S23.

[S23] A variable a, a variable b, a slot number, an expectation value, and a route are calculated and preserved.

[S24] The slot trial position is incremented by 1.

[S25] It is determined whether or not a previous slot is a completely unused slot (It is determined whether or not all items of the table T4 are 0). When the previous slot is a completely unused slot, the processing operation proceeds to Step S26. In addition, when the previous slot is not a completely unused slot, the processing operation returns to Step S21.

Figure 15A:
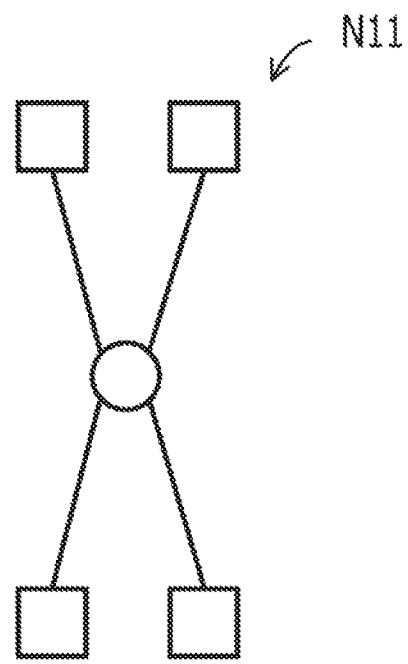
FIGS. 15A and 15B are diagrams illustrating network topologies.
Figure 15B:
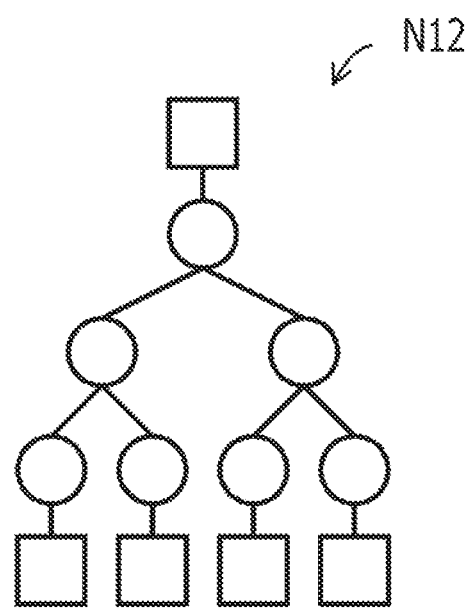
Figure 16A:
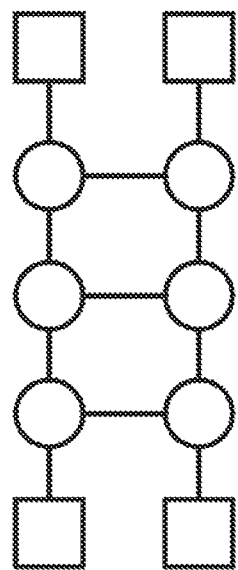
FIGS. 16A and 16B are diagrams illustrating network topologies.
Figure 16B:
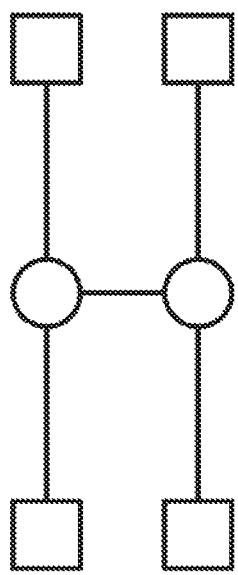

[S26] A maximum expectation value is selected from among preserved expectation values. Next, an advantageous effect will be described. FIG. 15A, 15B, 16A, and 16B are diagrams illustrating network topologies. A network N11 illustrated in FIG. 15A is a star topology. A network N12 illustrated in FIG. 15B is a tree topology. In addition, a network N13 illustrated in FIG. 16B is a ladder topology. A network N14 illustrated in FIG. 16B is a simple ladder topology.

FIG. 17A illustrates an expectation value calculation result for the star topology N11. FIG. 17B illustrates an expectation value calculation result for the tree topology N12. FIG. 17C illustrates an expectation value calculation result for the ladder topology N13. FIG. 17D illustrates an expectation value calculation result for the simple ladder topology N14. In the four types of basic topologies described above, expectation values when route allocation based on a full mesh connection is performed are calculated for 10 empty slots.

Examples of an evaluation made when a route is allocated to a slot include a case in which a route is randomly allocated, a case in which a route whose hop count is short is preferentially allocated, a case in which a route whose hop count is long is preferentially allocated, and a case in which a route is allocated on the basis of the present invention, and in each of the four cases, an average expectation value is calculated by trying the route allocation 100 times.

As illustrated in FIGS. 17A to 17D, the value of the expectation value calculation executed in the communication device 10 becomes a maximum value in all topologies. Namely, by executing a route allocation control in the communication device 10, it turns out that a greater number of routes to be subsequently added can be allocated.

Next, a communication device and a communication system will be described that perform slot allocation extending to groups and packet communication. In addition, the allocation of the timing of a slot (time slot) into which a route is embedded to a packet to be transmitted is called "slot allocation to the packet".

For example, when a packet p1 is transmitted with the timing of a slot s1 (The s1 is a slot number assigned to a slot), such an expression as "the slot s1 is allocated to the packet p1" is used.

Figure 18:
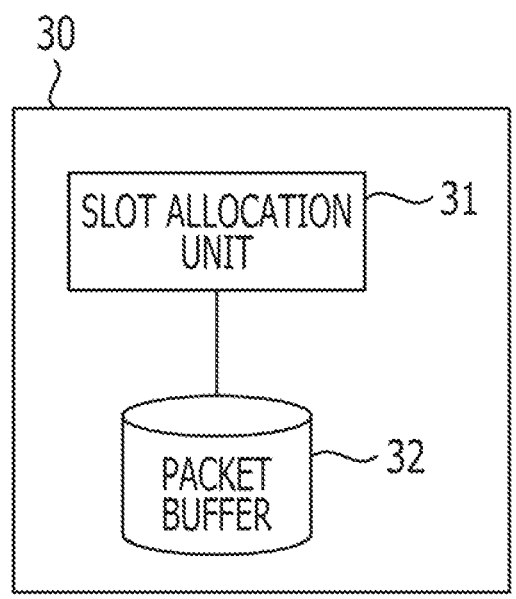
FIG. 18 is a diagram illustrating an example of a configuration of a communication device.

FIG. 18 is a diagram illustrating an example of the configuration of the communication device. A communication device 30 includes a slot allocation unit 31, which allocates a slot to a packet, and a packet buffer 32. When receiving a packet transmitted with a slot allocated by a previous group, the slot allocation unit 31 converts the slot number of the slot allocated by the previous group into a self communication slot number (self slot number) that is a number corresponding to a self group. In addition, the packet buffer 32 stores the self slot number and the packet with making a pair of the self slot number and the packet.

Here, at the time of packet transmission, the slot allocation unit 31 extracts a packet from the packet buffer 32, selects a self slot number, and allocates a slot having the self slot number to a packet.

In addition, when the self slot number is not selected, the slot allocation unit 31 selects a slot number, which is located posterior to the self slot number in terms of time and has a smallest time difference with respect to the self slot number, and allocates a slot having the selected slot number to a packet.

In addition, while, in the above description, the configuration is adopted in which the slot allocation unit 31 and the packet buffer 32 are included in one device, the functions thereof may be individually separated. For example, a configuration may be adopted in which the slot allocation unit 31 is disposed in a management server for managing the operation of a network and the packet buffer 32 is disposed in a node in the network.

Figure 19:
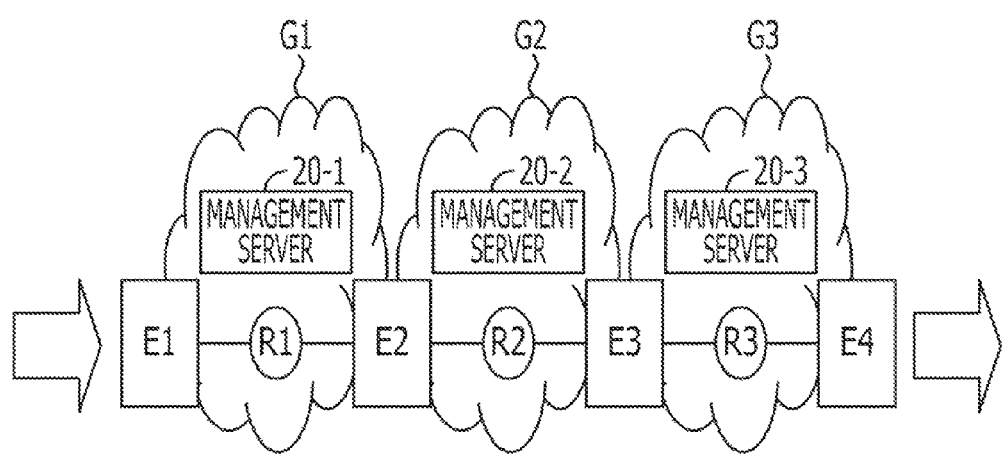
FIG. 19 is a diagram illustrating a grouped network.

Hereinafter, a group network to which the function of the communication device 30 is applied will be described in detail. FIG. 19 is a diagram illustrating a grouped network. Edge nodes E1 to E4 are serially connected, a relay node R1 is disposed between the edge nodes E1 and E2, a relay node R2 is disposed between the edge nodes E2 and E3, and a relay node R3 is disposed between the edge nodes E3 and E4.

In addition, a group G1 includes the edge nods E1 and E2, the relay node R1, and a management server 20-1, a group G2 includes the edge nodes E2 and E3, the relay node R2, and a management server 20-2, and the group G3 includes the edge nodes E3 and E4, the relay node R3, and a management server 20-3.

The edge nodes are disposed at the boundaries of the groups, and the edge nodes establish connections between groups. The management servers 20-1 to 20-3 in the groups G1 to G3 communicate with the edge nodes and the relay nodes in the groups, and individual groups independently operate.

Each of the edge nodes E1 to E4 includes a destination correspondence table in which the destination IP address of a packet is associated with a destination edge node and a slot number correspondence table in which a destination edge node is associated with a usage slot number.

In a case in which a packet the destination of which exists in the destination correspondence table arrives in the edge nodes E1 to E4, since slot allocation has been performed on the packet, an allocated slot is used without communicating with a management server. Accordingly, a reduction in the burden of the management server and the reduction of slot consumption are promoted.

In addition, in a case in which a packet the destination of which does not exist in the destination correspondence table arrives, since slot allocation has not been performed on the packet, an edge node that has received the packet makes a request for slot number allocation to a management server that communicates with the edge node.

Figure 20:
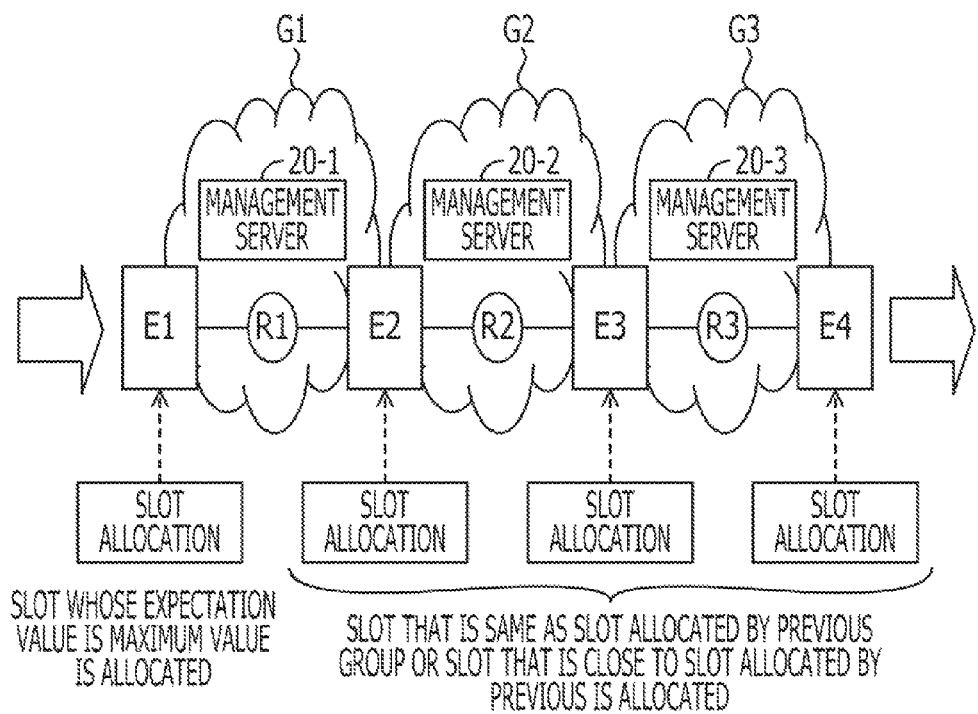
FIG. 20 is a diagram illustrating slot allocation that extends to groups.

FIG. 20 is a diagram illustrating slot allocation that extends to groups. The first group G1 located on an entry side selects a slot the expectation value of which is highest. Subsequently, an adjacent group located in a next stage selects a slot closest to the time slot of a previous group in terms of time.

Here, since there is a time difference between groups, a buffer for time adjustment is provided in an edge node located at the boundary of groups. In this regard, however, since a high-capacity buffer is not provided, it is necessary to reduce a time period during which the packet remains.

This requires that a slot closest to the time slot of a previous group in terms of time is selected. Namely, in a group located in a later stage, a slot closest, in terms of time, to a slot that emerges at the same time as that of a slot allocated by an adjacent group located in a previous stage, or emerges, in terms of time, posterior to the slot allocated by the adjacent group is selected.

For example, when the slot s1 is allocated by the group G1, the group G2 selects the slot s1 or a slot s2. When there is no time difference between the groups G1 and G2 and the groups G1 and G2 operate with the same timing, the slot s1 is the best possible slot, and at this time, the packet can be caused to pass with little buffering of the slot.

In addition, for example, it is assumed that there is a time difference between groups and a time corresponding to the slot s1 in the group G1 corresponds to a slot s5 in the group G2. At this time, if a packet allocated to the slot s1 by the group G1 is allocated to the slot s5 in the group G2, a time necessary for buffering becomes least, and hence the packet is caused to pass fastest.

However, when the number of packets transmitted using the slot s5 is largest, a slot s6 immediately after the slot s5 is selected as the best possible slot the buffering time of which is smallest in this case. Accordingly, in the group G2, the slot s6 is allocated to a corresponding packet, and the packet is caused to pass.

Figure 21:
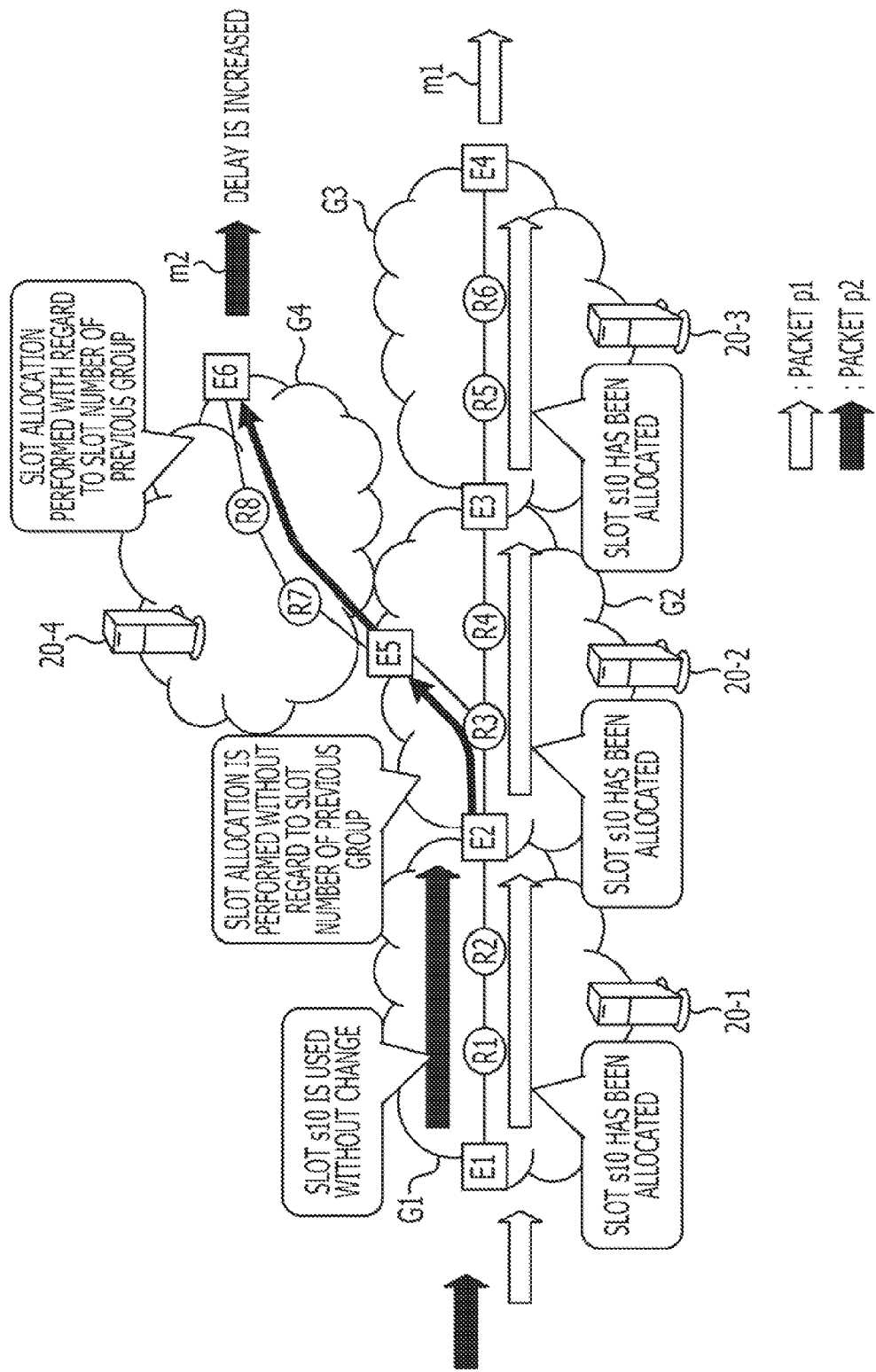
FIG. 21 is a diagram for explaining a problem of slot allocation that extends to groups.

By performing such slot allocation between groups as described above, it turns out that a high-capacity buffer is not necessary for the edge node and high-speed packet transmission can be performed. FIG. 21 is a diagram for explaining a problem of slot allocation that extends to groups. Groups G1 to G3 are serially connected, and the group G2 is connected to the group G4. The group G1 includes edge nodes E1 and E2, relay nodes R1 and R2, and a management server 20-1, and the group G2 includes edge nodes E2, E3, and E5, relay nodes R3 and R4, and a management server 20-2.

The group G3 includes edge nodes E3 and E4, relay nodes R5 and R6, and a management server 20-3, and the group G4 includes edge nodes E5 and E6, relay nodes R7 and R8, and a management server 20-4.

In such a network configuration as described above, it is assumed that a packet p1 is transmitted through a route m1 indicated by white arrows, and it is assumed that a packet p2 is transmitted through a route m2 indicated by black arrows. Since the group G1 is an entry-side group, the group G1 allocates a slot s10 the expectation value of which is highest to the packet p1 that has arrived first.

In addition, if the groups G1 to G3 operate with the same timing, the group G2 also allocates the slot s10 to the packet p1, thereby transmitting the packet p1 through the route m1, and the group G3 also allocates the slot s10 to the packet p1, thereby transmitting the packet p1 through the route m1.

On the other hand, a case will be considered in which, following the packet p1, the packet p2 has arrived in the group G1. In a case in which the destination of the packet that has arrived exists in the destination correspondence table, since a slot has been allocated to the packet p2, the group G1 uses a slot already allocated to the packet p2 without communicating with the management server 20-1.

Here, since the destination of the packet that has arrived in the edge node E1 is the edge node E2, and the route m1 is substantially identical to the route m2, the destination of the packet has been known and registered in a table.

Accordingly, in the group G1, the edge node E1 communicates with the management server 20-1, and using the slot s10 without change, transmits the packet p2 to the edge node E2 without making a request for new slot allocation for the packet p2.

The packet p2 arrives in the edge node E2 in the group G2. Since, in the edge node E2, the routes m1 and m2 are branched and the route m2 is not a known route, slot allocation is performed on the packet p2 in the group G2. In this case, since the group G2 corresponds to an entry-side group for the packet p2, it turns out that, in the group G2, a slot the expectation value of which is a maximum value in the group G2 is allocated to the packet p2.

Namely, while, in the group G1, the slot s10 is allocated to the packet p2, it turns out that a slot the expectation value of which is a maximum value in the group G2 is allocated to the packet p2, the slot being irrelevant to the slot s10.

For example, a case may occur in which a slot s50 the expectation value of which is a maximum value in the group G2 is allocated to the packet p2 that has arrived using the slot s10. In such a case, since buffering is performed on a time duration ranging from the slot s10 to the slot s50 so that the packet p2 is transmitted with the timing of the slot s50, a delay turns out to be increased.

As describe above, in a case in which a packet, into which a slot has been allocated by another group, arrives, when a packet passes through a plurality of groups, packet transmission may be performed by carrying out slot allocation in which a slot number allocated by the other group is disregarded, and a delay may turn out to be increased. Accordingly, in such a situation, it is necessary to perform slot allocation intended to reduce a delay.

Figure 22:
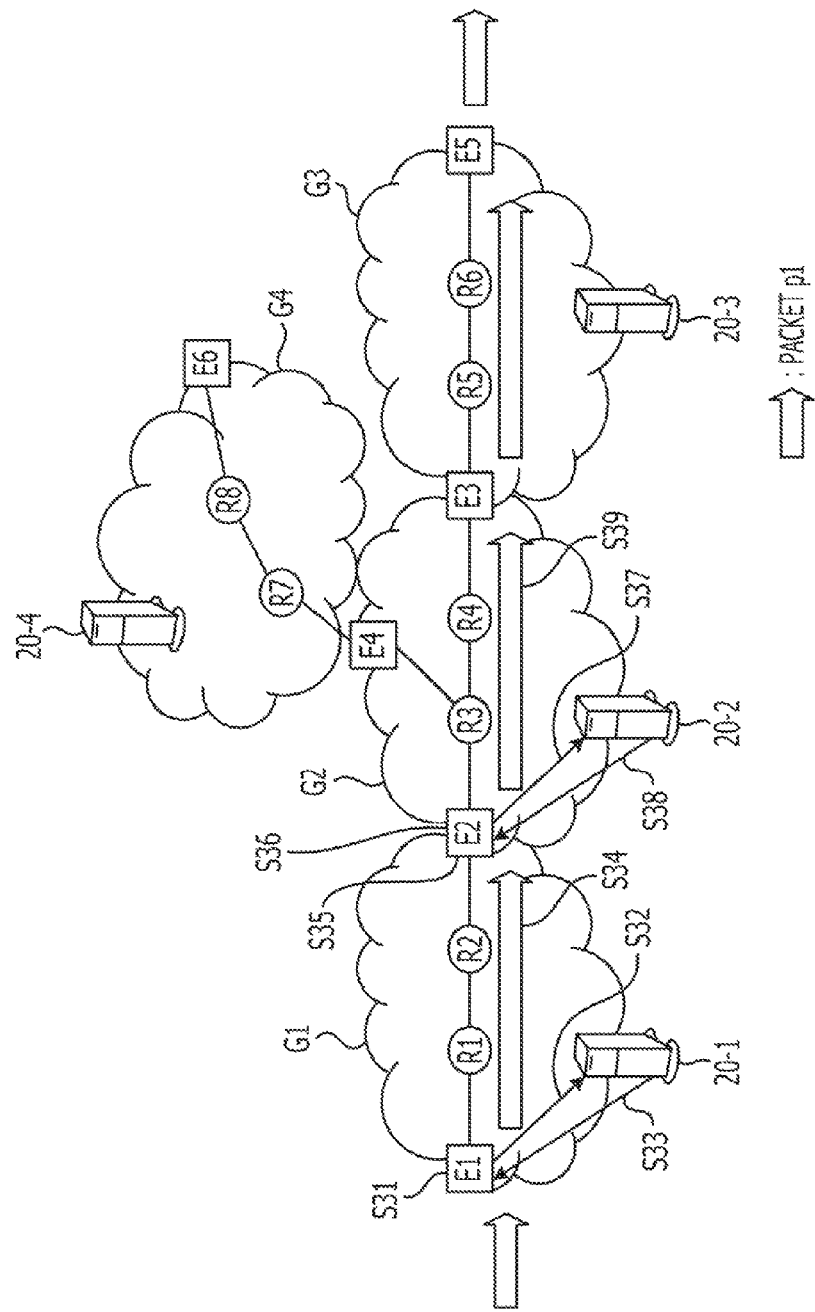
FIG. 22 is a diagram illustrating a flow of packet transmission.

Next, a group network will be described into which the function of the communication device 30 for solving the above-mentioned problem is applied. FIG. 22 is a diagram illustrating the flow of packet transmission. FIG. 22 illustrates the flow of packet transmission when the packet p1 having a destination address (10.0.3.1) first arrives in the group G1.

In FIGS. 23 and 24, correspondence tables between destination addresses and destination nodes are illustrated. A table T11 illustrated in FIG. 23 is included in the edge node E1 illustrated in FIG. 22, and a table T12 illustrated in FIG. 24 is included in the edge node E2 illustrated in FIG. 22.

[S31] The packet p1 having the destination address (10.0.3.1) arrives in the group G1. The edge node E1 acquires a destination node number E2 in the group G1 from the destination address on the basis of the table T11.

[S32] Since a route extending from the edge node E1 to the destination node E2 does not exist yet at this time and is not found, the edge node E1 notifies the management server 20-1 of a node number and makes a request for route allocation.

[S33] The management server 20-1 embeds a route into a slot the expectation value of which is highest, and notifies the edge node E1 of the slot (assumed as the slot s10).

[S34] The edge node E1 transmits the packet p1 using the timing of the slot s10 (The packet p1 to which the slot s10 is allocated is transmitted).

[S35] On the basis of a preliminarily calculated slot time difference between the group G1 and the group G2, the edge node E2 converts a slot number allocated by the group G1 into a slot number in the group G2, which is closest to the former slot number in terms of time and corresponds to the group G2. In this example, if it is assumed that the time difference is 0, the closest slot is a slot s10 that is the same as that in group G1, and it is assumed that the slot is converted into the slot s10.

Figure 25:
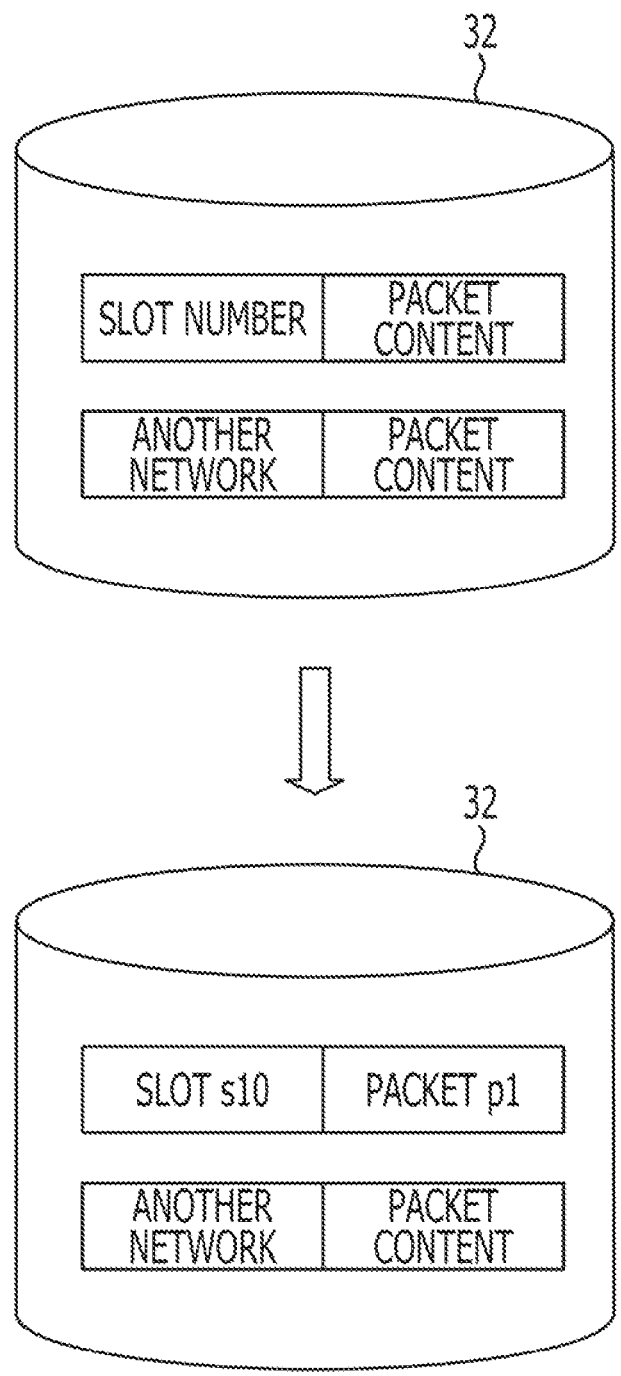
FIG. 25 is a diagram illustrating a packet buffer.

In FIG. 25, a packet buffer is illustrated. The packet buffer 32 is disposed in each edge node, and two pieces of information, namely, the packet content of a reception packet and a self slot number, are stored in the packet buffer 32. In addition, since packets transmitted from usual IP networks, on which the slot allocation of the present technique is not performed, are also received in an edge node, packet contents relating to these networks are also stored in the packet buffer 32.

In the example of the edge node E2, a slot number (slot s10) closest in terms of time in the group G2, calculated on the basis of a slot time difference between the group G1 and the group G2, and the content of the packet p1 to be transmitted with the timing of the slot number are stored.

[S36] The edge node E2 acquires a destination node number E3 in the group G1 from the destination address on the basis of the table T12.

[S37] Since a route extending from the edge node E2 to the destination node E3 does not exist yet and is not found at this time, the edge node E2 notifies the management server 20-2 of a node number and makes a request for route allocation. At this time, the edge node E2 acquires an optimum slot number in the self group G2, stored in the packet buffer 32, and also transmits the slot number (slot s10) to the management server 20-2.

[S38] The management server 20-2 detects an empty slot the number of which is closest to the slot number given notice of. In addition, the management server 20-2 embeds a route into the detected slot, and notifies the edge node E2 of the number of the slot into which the route is embedded (In this example, since it is assumed that there is little time difference between the groups G1 to G3, the slot s10 is selected).

[S39] The edge node E2 transmits the packet p1 to the destination edge node E3 using the slot s10 given notice of. Subsequently, such a control operation as described above are continued until the packet reaches the exit of the group.

Figure 26:
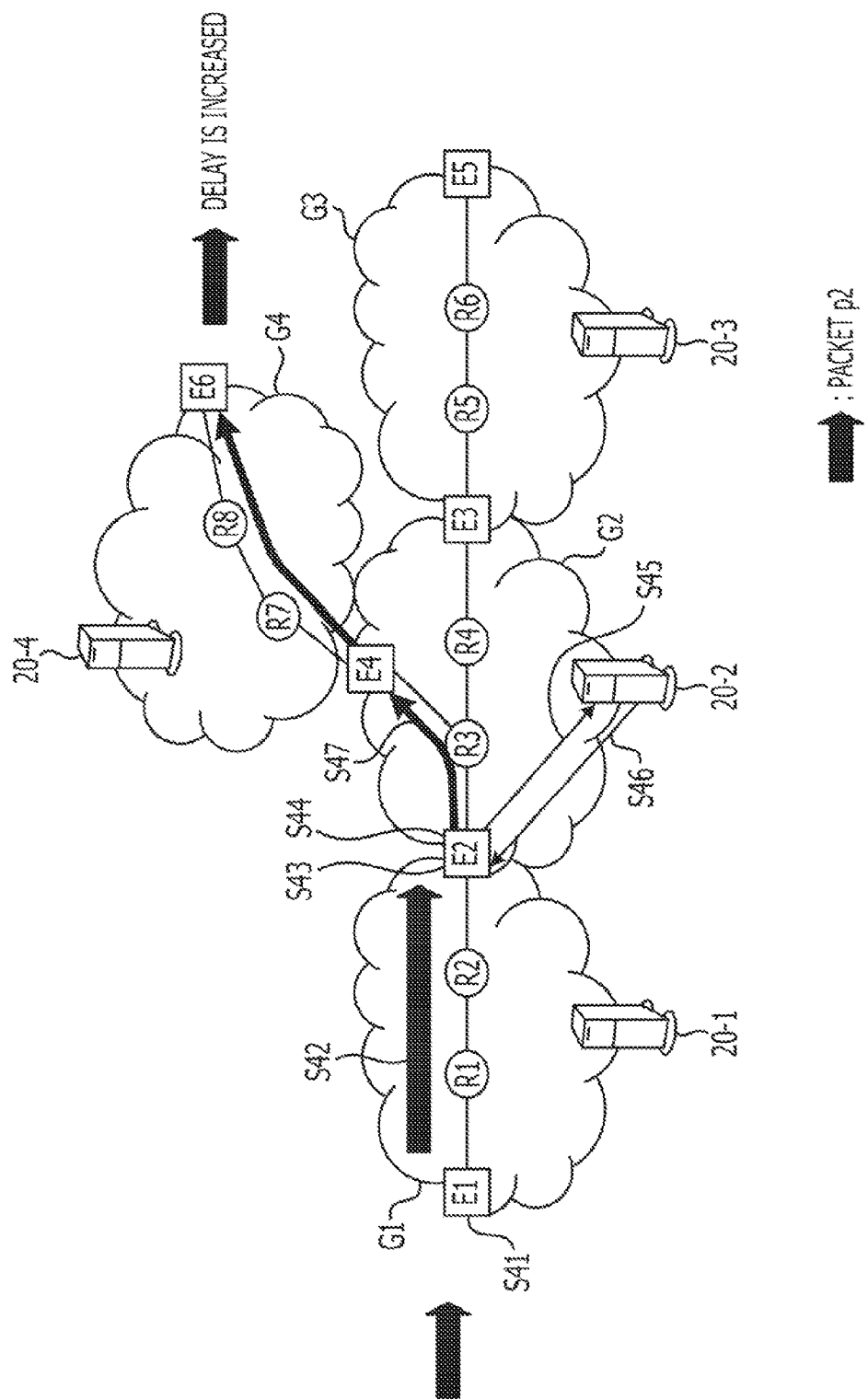
FIG. 26 is a diagram illustrating a flow of packet transmission.

FIG. 26 is a diagram illustrating the flow of packet transmission. FIG. 26 illustrates the flow of packet transmission when, following the packet p1, a packet p2 having a destination address (10.0.4.1) arrives in the group G1.

[S41] The packet p2 having a destination address (10.0.4.1) arrives in the group G1. The edge node E1 acquires a destination node number E2 in the group G1 from the destination address on the basis of the table T11.

[S42] Since a route extending from the edge node E1 to the destination node E2 has been already allocated, the edge node E1 transmits the packet p2 with the timing of the previous slot s10.

[S43] By performing the same control operation as that in Step S35, the edge node E2 converts a slot number allocated by the group G1 into a slot number in the self group. Here, since the slot is converted into the slot s10, two pieces of information, namely, the packet content of the packet p2 and the slot number (s10) closest in the group G2 are stored in the packet buffer 32.

[S44] The edge node E2 acquires a destination node number E4 in the group G2 from the destination address on the basis of the table T12.

[S45] Since a route extending from the edge node E2 to the destination node E4 is not found, the edge node E2 notifies the management server 20-2 of a node number and makes a request for route allocation. At this time, the edge node E2 acquires an optimum slot number in the self group G2, stored in the packet buffer 32, and also transmits the slot number (slot s10) to the management server 20-2.

[S46] The management server 20-2 detects an empty slot the number of which is closest to the slot number given notice of. In addition, the management server 20-2 embeds a route into the detected slot, and notifies the edge node E2 of the number of the slot into which the route is embedded (Since the slot s10 has been already allocated, a slot s11 closest to the slot s11 is selected. In addition, if the slot s11 has also been already allocated, a slot s12 is selected, for example).

[S47] The edge node E2 transmits the packet p2 to the destination edge node E4 using the slot s11 given notice of. Subsequently, such a control operation as described above are continued until the packet reaches the exit of the group.

As described above, according to the above-mentioned configuration, when a packet transmitted with a slot allocated by a previous group is received, the slot number of the slot allocated by the previous group is converted into a self slot number that is a number corresponding to a self group, and the self slot number and the packet are stored with a pair of the self slot number and the packet being made.

In addition, at the time of packet transmission, a packet is extracted from a packet buffer, and a slot having a self slot number is allocated to the packet. In addition, when it is difficult to use the self slot number, a slot number, which is located posterior to the self slot number in terms of time and has a smallest time difference with respect to the self slot number, is selected. In addition, a slot having the selected slot number is allocated to the packet.

Accordingly, even in a case in which a packet, to which a slot has been allocated by another group, arrives, when a packet passes through a plurality of groups, packet transmission is performed by allocating a slot number close to the slot number allocated by the other group. Therefore, a delay can be reduced, and the improvement of transmission quality can be promoted.

Next, another embodiment will be described. In the above-described slot allocation extending to groups, slot allocation has been described that relates to an N-output portion (for example, a portion corresponding to the edge node E2 in FIG. 26) of a 1:N group network outputting a plurality of outputs for one input. Hereinafter, slot allocation will be described that relates to an N-output portion of an N:M group network outputting a plurality of outputs for a plurality of inputs.

Figure 27:
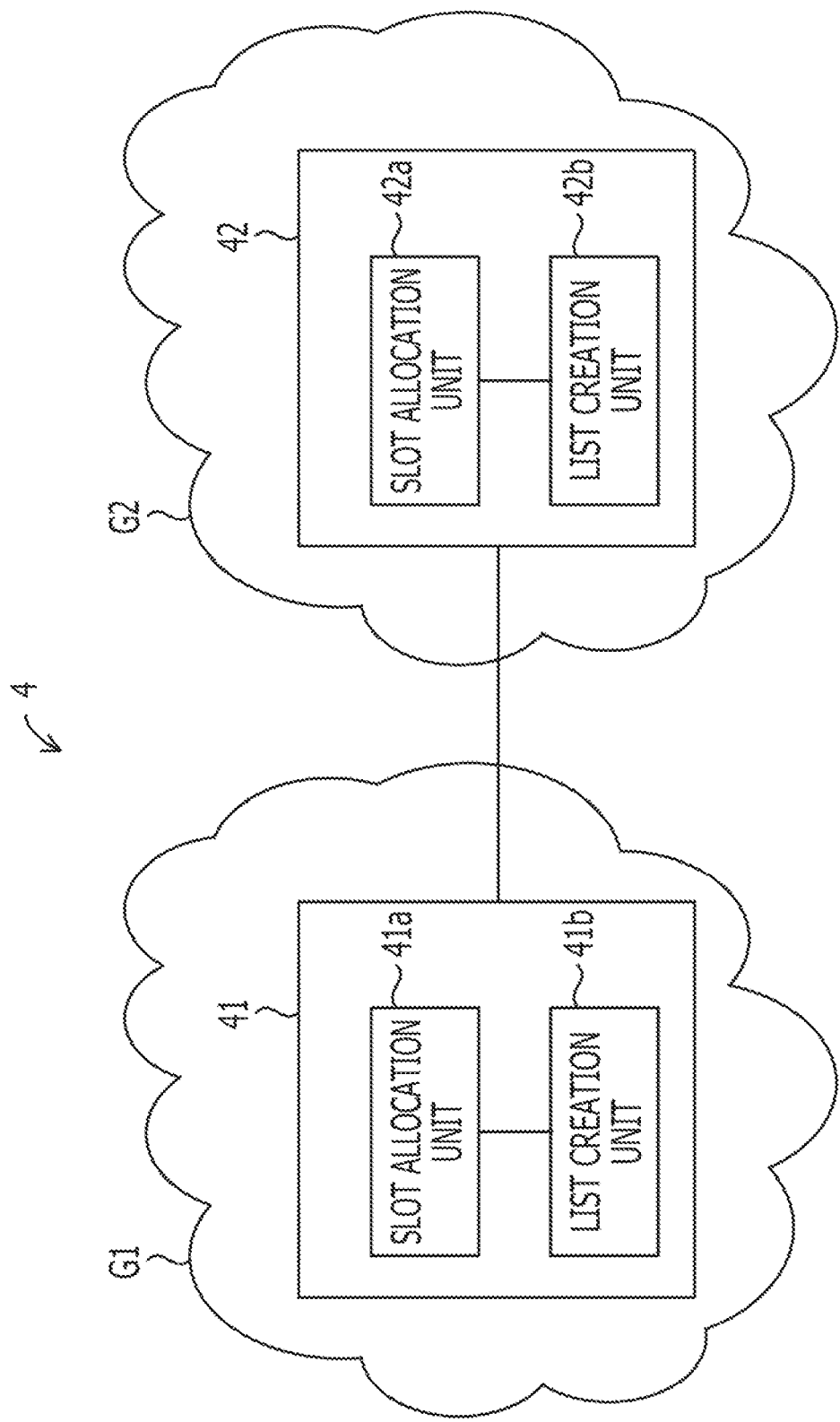
FIG. 27 is a diagram illustrating an example of a configuration of a communication system.

FIG. 27 is a diagram illustrating an example of the configuration of a communication system. A communication system 4 includes a communication device 41 (a first communication device) and a communication device 42 (a second communication device). The communication device 41 is located in a group G1, and the communication device 42 is located in a group G2.

The communication device 41 includes a slot allocation unit 41*a* and a list creation unit 41*b*. The slot allocation unit 41*a* allocates a first slot to a packet. The list creation unit 41*b* registers the slot number of the allocated first slot on a list, and transmits the list to a group located in a next stage.

The communication device 42 includes a slot allocation unit 42*a* and a list creation unit 42*b*. The slot allocation unit 42*a* allocates a second slot to a packet. The list creation unit 42*b* registers the slot number of the allocated second slot on the list transmitted from the group G1.

Using such a configuration as described above, a group located in a later stage is notified of the list of a slot number allocated by each group, and the group located in a later stage performs slot allocation on the basis of the list. Accordingly, even in a network to which a plurality of groups are connected, each group can efficiently perform slot allocation.

In addition, while, in the above description, the configuration has been described in which the slot allocation unit and the list creation unit are included in one device, individual functions may be separated. For example, a configuration may be adopted, in which a slot allocation unit is disposed in a management server for performing the operational management of a network, and a list creation unit for creating a list and transmitting the list to a group located in a next stage is disposed in a node in the network.

Figure 28:
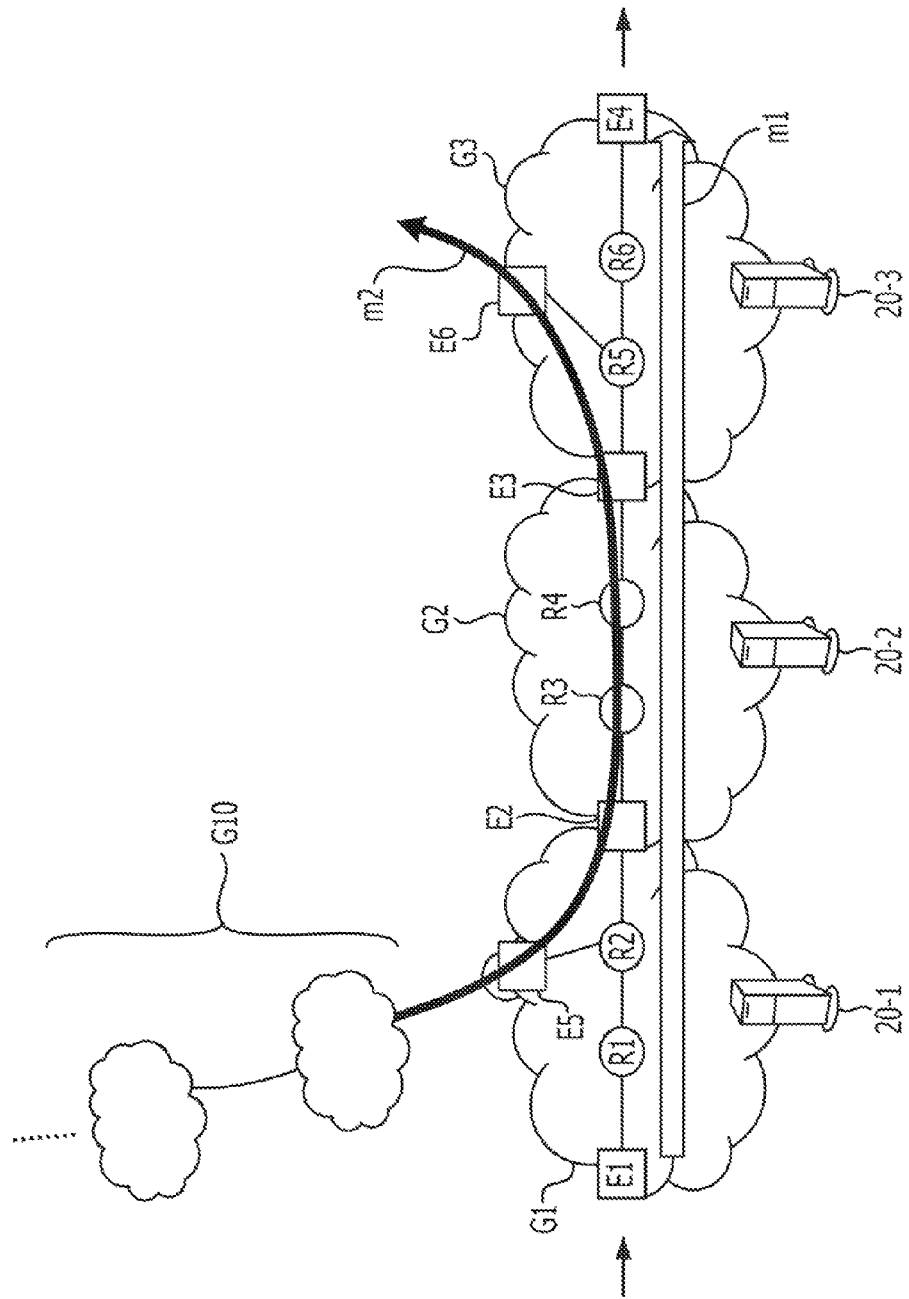
FIG. 28 is a diagram illustrating a flow of packet transmission.

Next, an operation will be described in detail. FIG. 28 is a diagram illustrating the flow of packet transmission. Groups G1 to G3 are serially connected. The group G1 includes edge nodes E1, E2, and E5, relay nodes R1 and R2, and a management server 20-1. The group G2 includes edge nodes E2 and E3, relay nodes R3 and R4, and a management server 20-2. The group G3 includes edge nodes E3, E4, and E6, relay nodes R5 and R6, and a management server 20-3.

In such a network configuration as described above, it is assumed that a route m1 the direction of which is indicated by a white arrow has been already established. In this case, when a route m2 the direction of which is indicated by a black arrow is generated, such control of slot allocation as described above is performed in the group G3 (edge node E3).

Here, slot allocation performed in the group G1 (edge node E5) will be considered. It is assumed that, when a packet is transmitted to the group G1 through the route m2 the direction of which is indicated by the black arrow, the packet arrives in the group G1 through a group family G10 including a plurality of groups.

Since, as described above, slot allocation in a group G(n) is determined on the basis of a slot allocated by a previous group G(n−1), slot allocation in each group in the group family G10 located on the previous-stage side of the group G1 is performed until the packet reaches the group G1.

Accordingly, even in the group G1, slot allocation turns out to be performed on the basis of a slot allocated by the group family G10 that is located on the previous-stage side of the group G1 and includes the plural groups. However, a slot to be allocated by the group G1 may have a large time difference with respect to a slot allocated in the route m1.

For example, it is assumed that a slot s10 is allocated to the route m1. It is assumed that, in individual groups in the group family 10, . . . a slot s40, a slot s48, a slot s49, . . . are allocated, and the group G1 is reached.

In this case, if a slot s50 is allocated by the group G1 on the basis of the slot allocation of the group family 10, the slot s10 has been already allocated by the edge node E2, and hence buffering for a time difference between the slot s50 and the slot s10 turns out to be performed in the edge node E2. Therefore, a route having a shortest time is not able to be generated, which leads to the reduction of transmission quality.

If a termination point is reached using such a algorithm that, when slot allocation is performed in the group G(n), the slot allocation is determined on the basis of a slot allocated by the previous group G(n−1), no problem occurs. However, if slot allocation based on the algorithm is performed in a halfway group, a route having a shortest time may not be generated, as described above. A function based on the communication system 4 improves such a situation.

Figure 29:
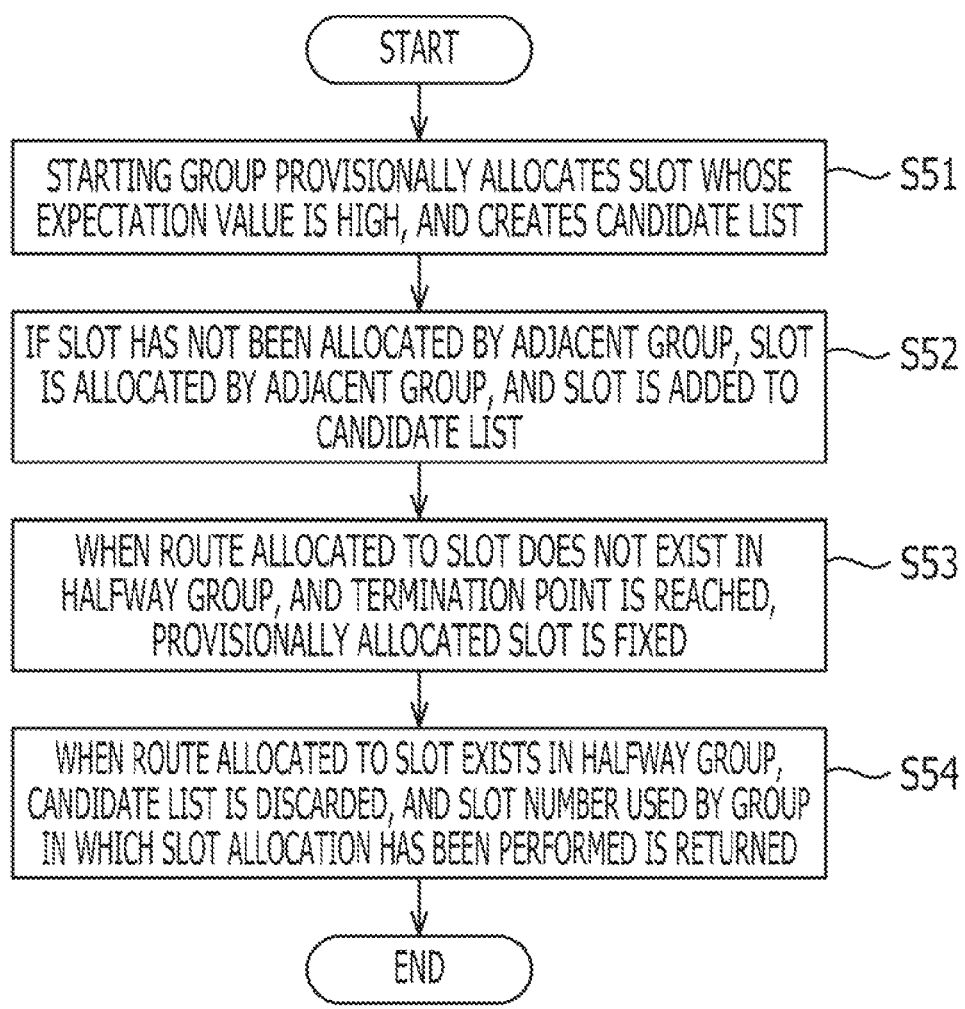
FIG. 29 is a flowchart illustrating an operation.

FIG. 29 is a flowchart illustrating an operation.

[S51] A starting group provisionally allocates a slot the expectation value of which is high, and creates and transmits a candidate list for a slot to an adjacent group.

[S52] If a slot has not been allocated by the adjacent group, an allocatable slot is provisionally allocated with a small time difference in the adjacent group. In addition, the slot is added to the candidate list and the candidate list is passed to an adjacent group.

[S53] When the operations of Step S51 and Step S52 are performed, a route allocated to a slot does not exist, and a termination group is reached, the provisionally allocated slot is fixed.

[S54] When the operations of Step S51 and Step S52 are performed and a group in which slot allocation has been performed exists on the way, the candidate list is discarded there, and the slot number used by the group in which slot allocation has been performed is returned backward. A group that has received the returned slot number allocates a slot the number of which is close to the slot number.

Figure 30:
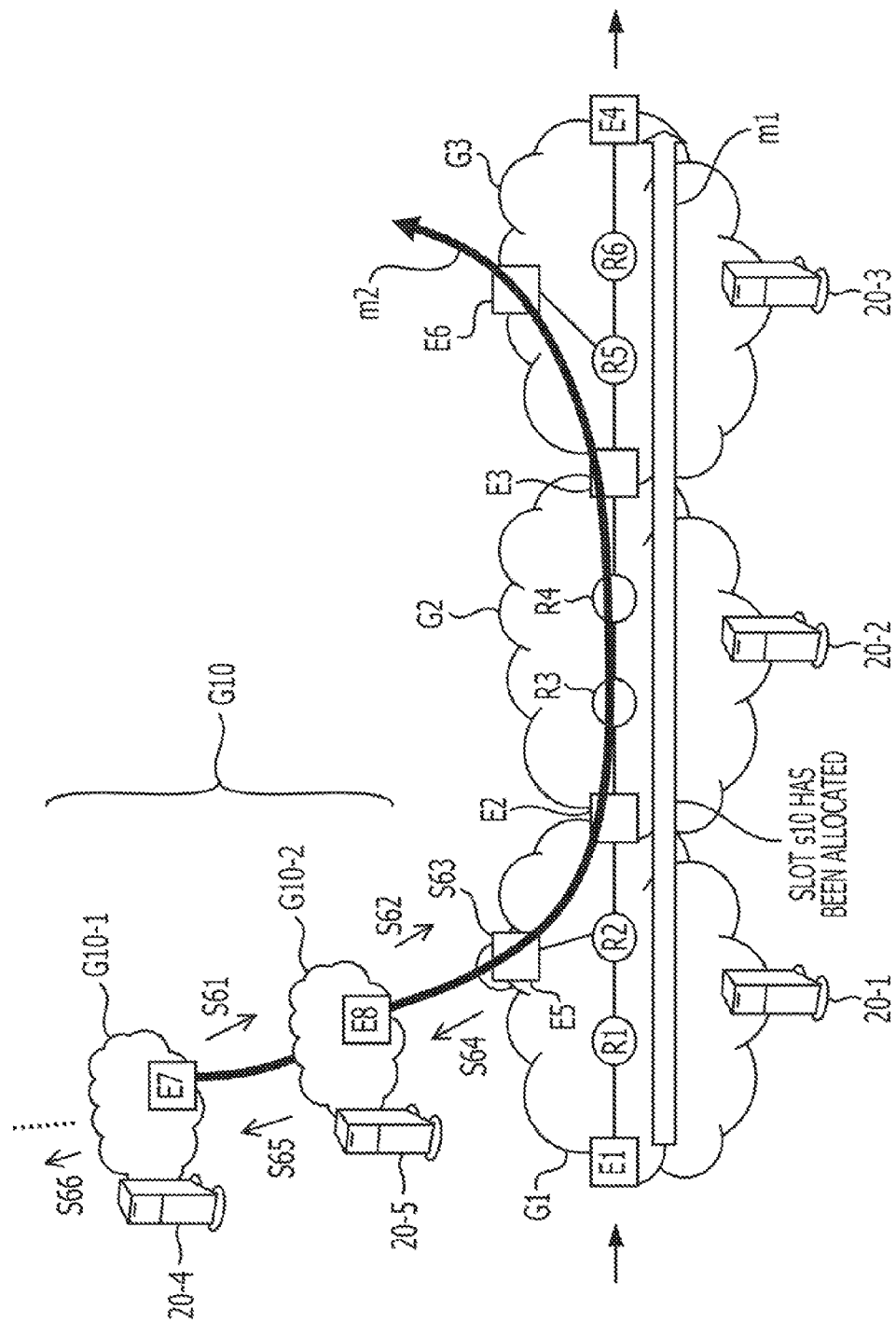
FIG. 30 is a diagram for explaining an operation.

FIG. 30 is a diagram for explaining an operation. A basic network configuration is the same as that in FIG. 28. A group family G10 includes groups G10-1 and G10-2. The group G10-1 includes an edge node E7 and a management server 20-4, and the group G10-2 includes an edge node E8 and a management server 20-5. In addition, it is assumed that a slot s10 is allocated to a route m1.

[S61] The management server 20-4 in the group G10-1 in the group family G10 provisionally allocates a slot s48. The edge node E7 adds the slot s48 to a candidate list, and transmits the candidate list to the adjacent group G10-2.

[S62] The management server 20-5 in the group G10-2 provisionally allocates a slot s49. The edge node E8 adds the slot s49 to the candidate list, and transmits the candidate list to the adjacent group G1.

[S63] In the management server 20-1 in the group G1, since a slot s10 subjected to slot allocation exists, the candidate list transmitted from the group G10-2 is discarded.

[S64] The management server 20-1 in the group G1 returns the currently used slot number s10 to the group G10-2.

[S65] The management server 20-5 in the group G10-2 allocates a number closest to the slot number s10 on the basis of the received slot number s10. For example, a slot s9 is allocated. In addition, the slot number s9 is returned to the group G10-1.

[S66] The management server 20-4 in the group G10-1 allocates a number closest to the slot number s9 on the basis of the received slot number s9. For example, a slot s8 is allocated. In addition, the slot number s8 is returned to a group located in a previous stage. Subsequently, the same operation is performed backward up to a group located in a starting point.

As described above, when a route to which a slot is allocated does not exist in the group G(n), a management server (first slot allocation unit) in the group G(n−1) provisionally allocates, in the group G(n−1), a slot used for transmission through a predetermined-time route, and an edge node (first list creation unit) in the group G(n−1) registers the slot number of the allocated slot on the candidate list and transmits the candidate list to the group G(n).

In the same way, a management server (second slot allocation unit) in the group G(n) provisionally allocates, in the group G(n), a slot used for transmission through a predetermined-time route, and an edge node (second list creation unit) in the group G(n) registers the slot number of the allocated slot on the candidate list.

Here, if a group G(n+1) located in a next stage is connected to the group G(n), the edge node in the group G(n) relay-transmits the candidate list to the group G(n+1). In addition, if the group G(n) is a termination group, each of management servers in the groups G(n−1) and G(n) fixes the provisionally allocated slot. Namely, slot allocation is performed on a packet using the provisionally allocated slot. Accordingly, in a network to which a plurality of groups are connected, each group can efficiently perform slot allocation.

On the other hand, when a route to which a slot has been allocated exists in the group G(n), the management server in the group G(n−1) discards the candidate list transmitted from the group G(n−1). In addition, the management server in the group G(n−1) performs a control operation for returning the slot number of a slot already allocated by the group G(n) to the group G(n−1) located in a previous stage.

In addition, the management server in the group G(n−1) selects a slot number having a smallest time difference with respect to the slot number of the returned slot, and allocates a slot having the selected slot number to a packet. In addition, the management server in the group G(n−1) returns the slot number selected in the group G(n−1) backward to the group G(n−2) located in a previous stage. Subsequently, the same operation is performed backward up to a starting group.

In this way, the configuration is adopted, in which a management server in an adjacent group is notified of a plurality of slot candidates, and when a group in which a slot has been allocated exists until a termination management server finally selects a slot that can be allocated with a shortest time, a first allocation candidate is discarded and a slot close to an allocated slot is allocated. Accordingly, a route that has the shortest time and extends from a starting group to a termination group can be generated, and hence the improvement of transmission quality can be promoted.

While, as described above, the embodiment has been exemplified, the configurations of individual portions illustrated in the embodiment can be replaced with other components having the same functions. In addition, another arbitrary component or process may be added.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A route allocation method comprising:
calculating a route between a sending node and a receiving node in a network; and
allocating, by a communication device, the route to a communication slot,
wherein the allocating further selects route allocation for the communication slot based on a number of allocatable routes that are other routes not including a link, whose transfer direction is the same as a link being located in a route already embedded into the communication slot;
wherein the allocating selects route allocation whose expectation value for the number of the allocatable routes is a maximum value; and
wherein when the maximum number of the communication slots is S, the number of all routes in the network is C, link speed between nodes is v, a band of one of the communication slots is b, and the sum of the routes allocatable to (v / b) slots of the communication slots is k, the allocating calculates the expectation value in accordance with the following expression:

expectation value $= k/(C * S)$.

2. A communication system that performs packet communication across groups, comprising:
- a first communication device configured to include a first slot allocation unit that allocates a first communication slot to a packet and a first list creation unit that registers a communication slot number of the allocated first communication slot on a list and transmits the list to a group located in a next stage, and the first communication device also configured to be located in a first group; and
- a second communication device configured to include a second slot allocation unit that allocates a second communication slot to a packet and a second list creation unit that registers a communication slot number of the allocated second communication slot on the list transmitted from the first group, and the second communication device also configured to be located in a second group connected to the first group;
- wherein when a route to which the second communication slot is allocated does not exist in the second group,
    - the first slot allocation unit provisionally allocates, in the first group, the first communication slot used for transmission through a predetermined-time route, to a packet,
    - the first list creation unit registers the communication slot number of the allocated first communication slot on the list and transmits the list to the second group,
    - the second slot allocation unit provisionally allocates, in the second group, the second communication slot used for transmission through a predetermined-time route, to the packet, and
    - the second list creation unit registers the communication slot number of the allocated second communication slot on the list.

3. The communication system according to claim 2, wherein
- when a group located in a next stage exists with respect to the second group, the second list creation unit relay-transmits the list to the group located in the next stage; and
- when the second group is a termination group, the first slot allocation unit fixes the provisionally allocated first communication slot, and the second slot allocation unit fixes the provisionally allocated second communication slot.

4. The communication system according to claim 2, wherein
- when a route to which the second communication slot has been allocated exists in the second group,
- the second slot allocation unit discards the list transmitted from the first group, and returns the communication slot number of the second communication slot, and
- the first slot allocation unit selects a communication slot number having a smallest time difference with respect to the communication slot number of the returned second communication slot, allocates a communication slot having the selected communication slot number to the packet, and returns the selected communication slot number backward to a group located in a previous stage.

* * * * *